US012358315B1

(12) United States Patent
Ehara et al.

(10) Patent No.: US 12,358,315 B1
(45) Date of Patent: Jul. 15, 2025

(54) LONG MEDIUM

(71) Applicant: Max Co., Ltd., Tokyo (JP)

(72) Inventors: Takayuki Ehara, Tokyo (JP); Kazuya Igata, Tokyo (JP); Takuya Yamaguchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/935,051

(22) Filed: Nov. 1, 2024

(30) Foreign Application Priority Data

Mar. 29, 2024 (JP) ................................ 2024-056707
Aug. 9, 2024 (JP) ................................ 2024-133870

(51) Int. Cl.
*B41M 5/50* (2006.01)

(52) U.S. Cl.
CPC .................................. *B41M 5/502* (2013.01)

(58) Field of Classification Search
CPC .... B42D 5/023; B65H 20/20; B65H 2220/03; B65H 2301/5151; B65H 2511/114; B65H 2511/512; B65H 2553/412; B65H 26/063; B65H 26/066; B65H 27/00; B65H 2701/1211; B65H 2701/377; B65H 2801/03; Y10T 428/1476; B41J 29/44
USPC .......................... 400/703, 706, 706.1, 707.5
See application file for complete search history.

(56) References Cited

U.S. PATENT DOCUMENTS 1,881,715 A * 10/1932 Laurence ................ B41J 29/15 400/706.1
4,708,901 A * 11/1987 Wood ...................... B42D 5/02 428/137
5,810,494 A 9/1998 Menard et al.
6,401,616 B1 * 6/2002 Strobel .................. B41F 23/08 101/401.1
9,169,099 B2 10/2015 Ehara et al.
2002/0018089 A1 * 2/2002 Elgee .................. B41J 11/0095 347/16
2013/0202837 A1 * 8/2013 Ehara ...................... B41J 29/48 428/41.8
2016/0048744 A1 2/2016 Ehara et al.
(Continued)

FOREIGN PATENT DOCUMENTS

GB 2184098 A 6/1987
JP 2000-247003 A 9/2000
(Continued)

OTHER PUBLICATIONS

Jul. 1, 2024—(JP) Decision to Grant a Patent—App 2024-056707.
May 12, 2025—(EP) Extended Search Report—App 24210612.8.

*Primary Examiner* — Alicia J Weydemeyer
(74) *Attorney, Agent, or Firm* — Banner & Witcoff, Ltd.

(57) ABSTRACT

A long medium has a start end, a final end, a first side edge connecting the start end and the final end, and a second side edge connecting the start end and the final end. The long medium includes first reference holes formed at a first pitch along the first side edge, N pieces of first conveyance holes formed along the first side edge at a second pitch smaller than the first pitch, and formed between adjacent first reference holes, in which N is a positive integer, first index holes formed along the first side edge at a third pitch smaller than the first pitch and respectively positioned in first index hole forming areas each set between the adjacent first reference holes, and second reference holes formed at the first pitch along the second side edge.

19 Claims, 15 Drawing Sheets

(56) References Cited

U.S. PATENT DOCUMENTS

| | | | |
|---|---|---|---|
| 2017/0308775 | A1 | 10/2017 | Ehara et al. |
| 2019/0065916 | A1 | 2/2019 | Ehara et al. |

FOREIGN PATENT DOCUMENTS

| | | | |
|---|---|---|---|
| JP | 4771023 | B1 | 9/2011 |
| JP | 2014-231233 | A | 12/2014 |

* cited by examiner

LONG MEDIUM

CROSS-REFERENCE TO RELATED APPLICATIONS

The present application claims priority from Japanese Patent Application Nos. 2024-056707 filed on Mar. 29, 2024, and 2024-133870 filed on Aug. 9, 2024, the entire contents of which are incorporated herein by reference.

TECHNICAL FIELD

The present disclosure relates to a long medium.

BACKGROUND ART

A long medium for printing patterns and characters of signboards and the like are known. Such a long medium includes a release paper and an adhesive sheet temporarily adhered to the release paper. When a long medium wound in a roll shape is set in a printer, a pattern or a character is printed on the adhesive sheet, the adhesive sheet is half-cut into a specified shape using a cutting device of the printer, and the release paper is peeled off, the adhesive sheet on which the pattern or the like is printed and which is cut into a desired shape can be attached to a wall, a window, a paper, or the like. Here, half-cutting refers to cutting only the adhesive sheet and not cutting the release paper. This includes cutting the release paper by making an incision in the release paper but not completely cutting the release paper in a thickness direction.

In such a long medium, If the long medium run out during the printing, the printing up to that time is wasted. Therefore, JP4771023B discloses a long medium in which a remaining amount of the long medium can be visually and easily grasped. This long medium is formed with reference holes arranged at equal pitch along one side edge portion of the long medium, and holes indicating the remaining amount, which are provided between two adjacent reference holes. The holes indicating the remaining amount are provided at different positions between the two reference holes depending on the remaining amount of the long medium. According to such a long medium, the holes indicating the remaining amount are formed such that as the remaining amount decreases, the holes move away from one reference hole and approach the other reference hole, so that a user can visually grasp the remaining amount of the long medium based on a position of the hole indicating the remaining amount with respect to the reference hole.

The long medium described in JP4771023B has a configuration in which the remaining amount of the long medium is indicated by applying a total length of the long medium, which may be 10 m or longer, to a pitch between reference holes in some cases. Therefore, the user can only roughly grasp the remaining amount of the long medium. If the remaining amount of the long medium can be only roughly grasped, the user cannot accurately determine whether the remaining amount of the long medium is actually equal to or greater than a length of the pattern or the like to be printed. Furthermore, if the printing is forced to go ahead even though the remaining amount of the long medium is less than the length of the pattern or the like to be printed, a large amount of ink, the long medium, and a printing time required for the printing will be wasted.

In order to solve such a problem, there is a demand for a long medium that allows a remaining amount to be grasped in more detail.

Therefore, in the long medium described in JP4771023B, it may be possible to adopt a configuration that allows the remaining amount to be grasped in more detail. That is, the long medium described in JP4771023B has a configuration in which the remaining amount of the long medium is indicated by applying the total length of the long medium to the pitch between reference holes, so if the pitch between the reference holes is increased or the number of holes that serve as scales formed between the reference holes is increased, it is possible to indicate the remaining amount of the long medium in more detail. For example, if the pitch between the reference holes is doubled, or the number of holes serving as the scales formed between the reference holes is doubled, it is theoretically possible to indicate the remaining amount of long medium with twice the resolution.

However, if the pitch between the reference holes is made larger, it becomes difficult to find the reference holes formed in the long medium wound in a roll shape, or to find the holes indicating the remaining amount, and it also becomes difficult to grasp a relative position of the hole indicating the remaining amount in relation to the reference hole, making it more difficult for the user to visually grasp the remaining amount of the long medium. On the other hand, if the number of holes serving as the scales formed between the reference holes is increased, reading is difficult at a glance. Further, the number of holes can be increased by at most two times.

Therefore, the inventors of the present application have come up with the idea of using the other side edge portion of the long medium to indicate in detail the remaining amount of the long medium.

Here, by using the long medium described in JP4771023B and applying one half (first half) of the total length of the long medium to the pitch between the reference holes in one side edge portion, and the other half (second half) of the total length of the long medium to a pitch between the reference holes in the other side edge portion, it is also possible to indicate the remaining amount of the long medium with double the resolution without increasing the pitch between the reference holes and without increasing the number of holes that serve as the scales.

However, with such a configuration, the user has to find the holes indicating the remaining amount formed on any one of both the side edge portions, making it difficult to determine the remaining amount of the long medium at a glance. Further, since there are only two side edge portions, the remaining amount of the long medium can be indicated at best with twice the resolution.

Therefore, the inventors of the present application have come up with the idea of using holes that are disposed at an irregular pitch (non-uniform pitch) and that move as if circulating in an area between adjacent reference holes to indicate the remaining amount of the long medium in detail.

SUMMARY OF INVENTION

According to an aspect of the present disclosure, a long medium having a start end, a final end, a first side edge connecting the start end and the final end, and a second side edge connecting the start end and the final end, includes:

first reference holes formed at a first pitch along the first side edge;

N pieces of first conveyance holes formed along the first side edge at a second pitch smaller than the first pitch, and formed between adjacent first reference holes, in which Nis a positive integer;

first index holes formed along the first side edge at a third pitch smaller than the first pitch and respectively positioned in first index hole forming areas each set between the adjacent first reference holes;

second reference holes formed at the first pitch along the second side edge;

N pieces of second conveyance holes formed along the second side edge at the second pitch and formed between adjacent second reference holes; and second index holes respectively positioned in second index hole forming areas each set between the adjacent second reference holes along the second side edge, the second index holes being formed by alternating a plurality of first circulating holes that are continuously formed at a fourth pitch smaller than the third pitch with respect to the second index hole adjacent to a start end side, and a second circulating hole that is formed at a fifth pitch larger than the first pitch with respect to the first circulating hole adjacent to the start end side.

In the long medium, the second index hole forming area is set to an area from a first second conveyance hole adjacent to a final end side of the second reference hole on the start end side to an Mth second conveyance hole, in which M is a positive integer equal to or smaller than N.

When the first pitch is P1, the second pitch is P2, the third pitch is P3, the fourth pitch is P4, the fifth pitch is P5, a first reference length is L1, a first scale is S1, a second reference length is L2, and a second scale is S2, $$S1=P2/L1,$$

$$L2=L1/(M-1),$$

$$S2=P2/L2,$$

$$P3=P1-P1\times S1,$$

$$P4=P1-P1\times S2, \text{ and}$$

$$P5=P2\times(M-1)+P4,$$

when the first index hole is formed in the first index hole forming area closer to the start end and farther away from the final end, the first index hole is formed at a position farther away from an end portion on the start end side of the first index hole forming area and closer to an end portion on the final end side of the first index hole forming area, when the plurality of first circulating holes formed between adjacent second circulating holes are formed in the second index hole forming area closer to the start end and farther away from the final end, the first circulating holes are formed at positions farther away from the end portion on the start end side of the second index hole forming area and closer to the end portion on the final end side of the second index hole forming area, and the second circulating hole adjacent to the start end side of the plurality of first circulating holes is formed at a position farther away than the plurality of first circulating holes from the end portion on the start end side of the second index hole forming area in which the second circulating hole is formed and closer to the end portion on the final end side of the second index hole forming area.

According to the long medium of the above aspect, the first index holes formed along the first side edge portion can indicate a remaining amount of the long medium based on the first scale of applying the first reference length to the second pitch, while the second index holes formed along the second side edge portion can indicate the remaining amount of the long medium based on the second scale of applying the second reference length, which is obtained by dividing the first reference length by (M−1), to the second pitch. Therefore, the remaining amount of the long medium equal to or less than the first reference length can be indicated using the second index holes.

DESCRIPTION OF EMBODIMENTS

Hereinafter, embodiments of a long medium according to the present disclosure will be described with reference to the drawings.

First Embodiment

Figure 1A:
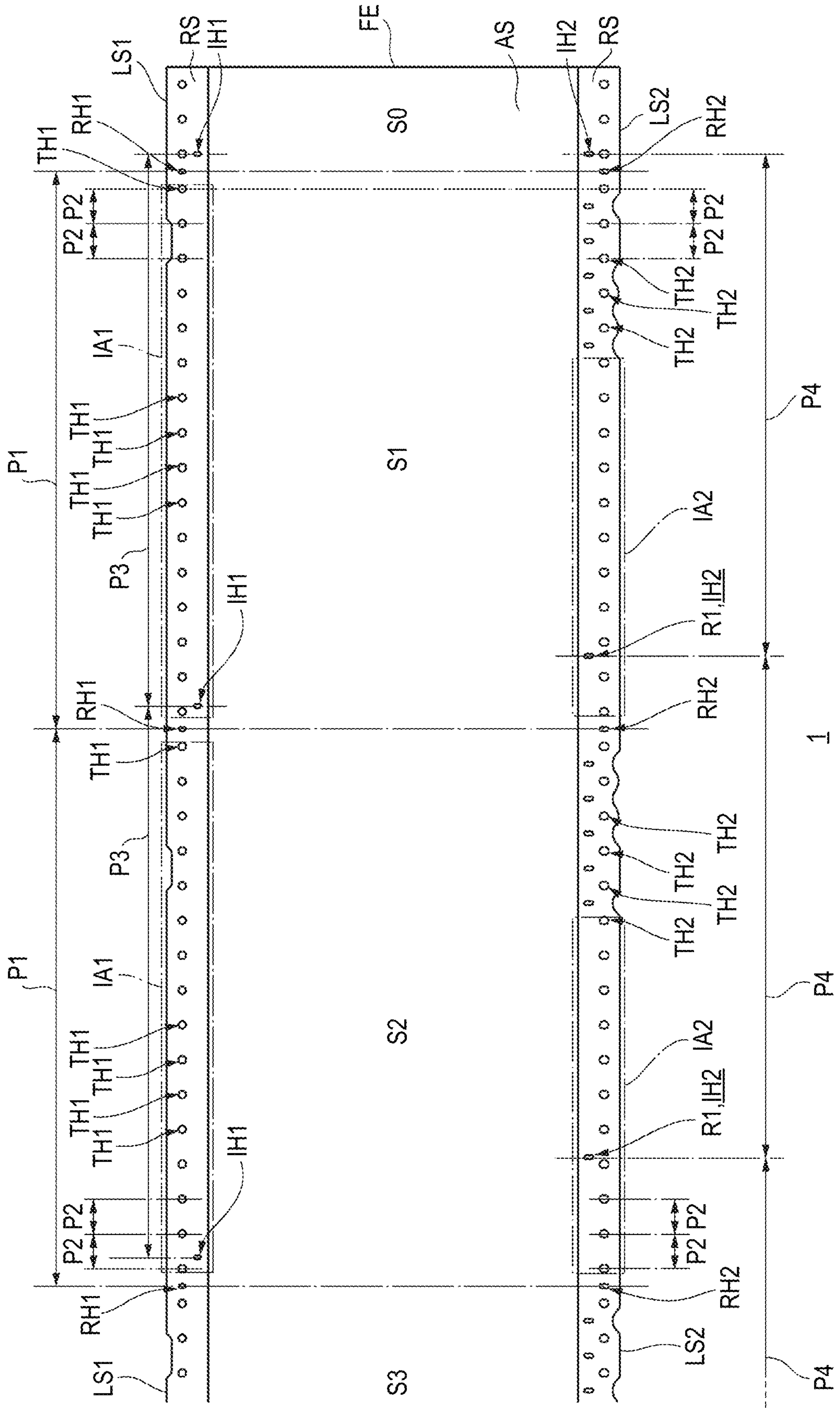
FIG. 1A is a part of a long medium according to an embodiment.
Figure 1B:
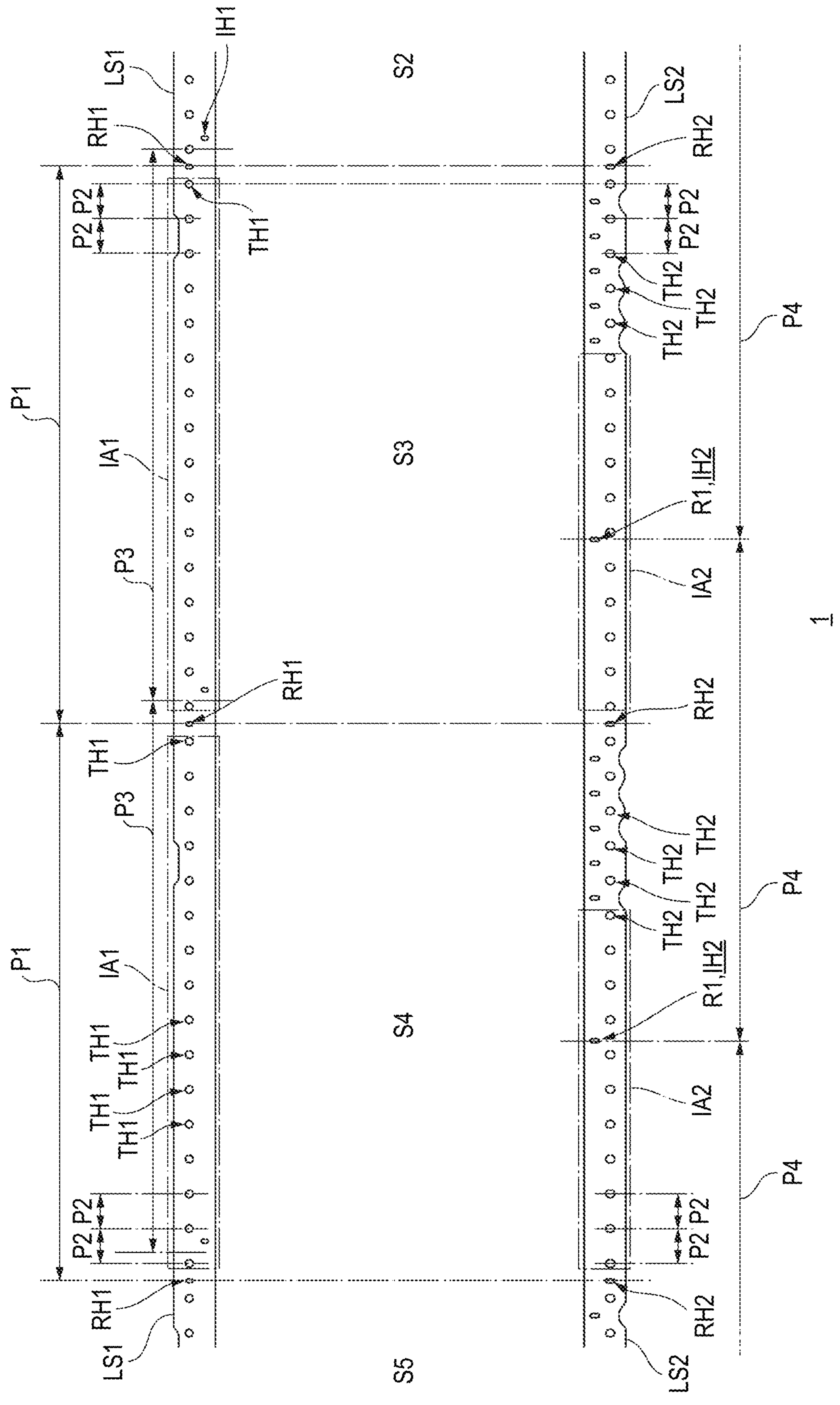
FIG. 1B is a part of the long medium according to the embodiment.
Figure 1C:
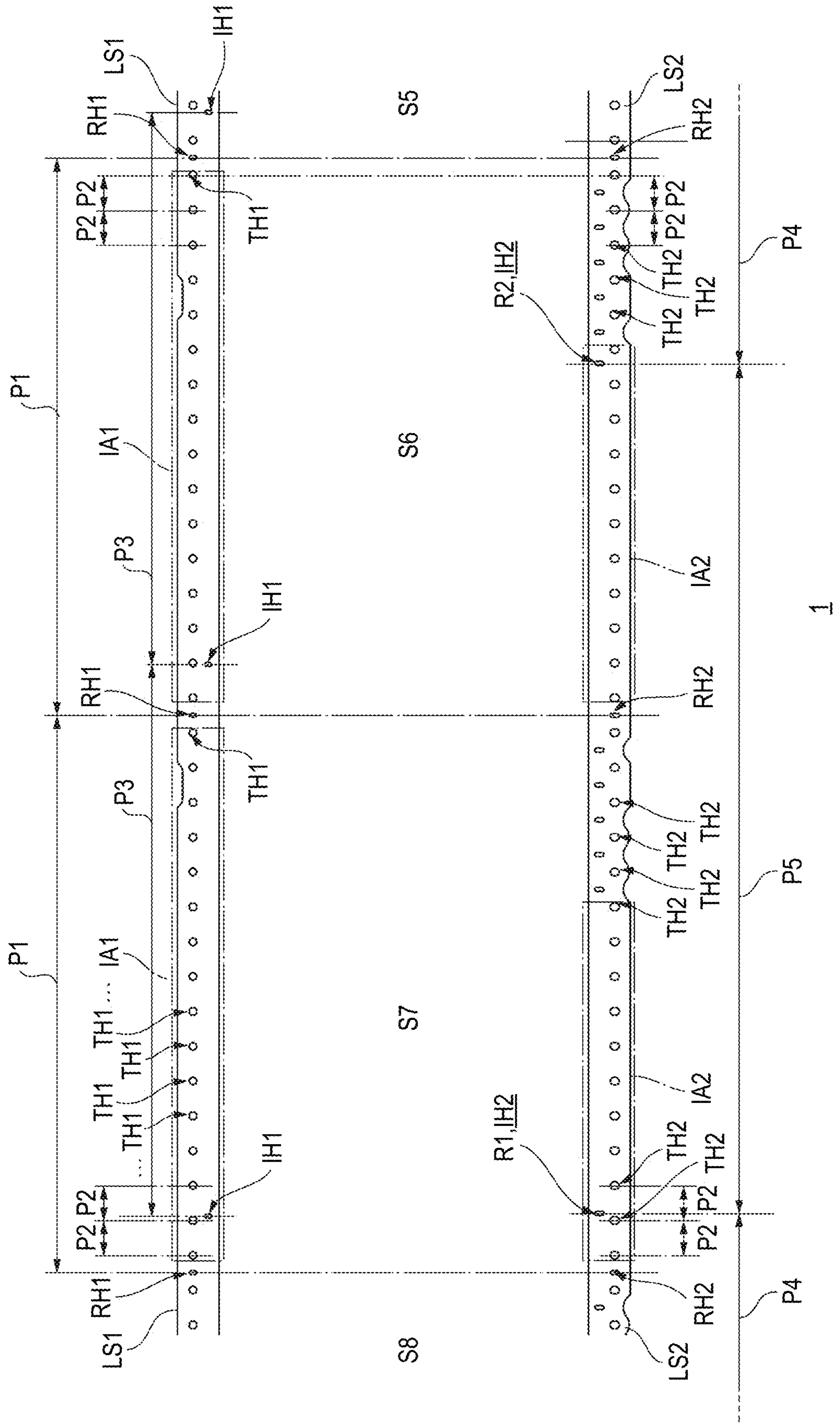
FIG. 1C is a part of the long medium according to the embodiment.
Figure 1D:
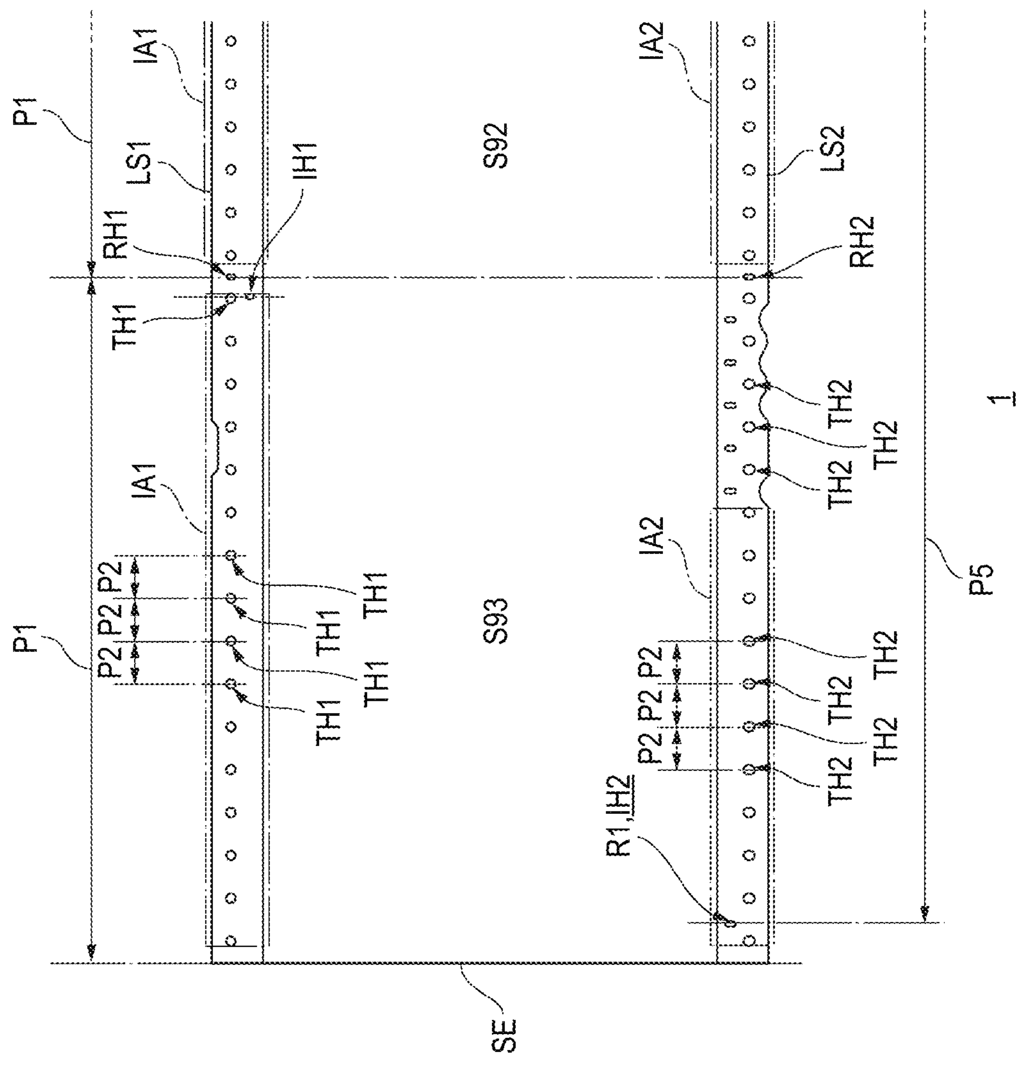
FIG. 1D is a part of the long medium according to the embodiment.

FIG. 1A is a plan view showing a part of a long medium 1 including a final end FE of the long medium 1 according to the present embodiment, FIG. 1D is a plan view showing a part of the long medium 1 including a start end SE of the long medium 1 in the present embodiment, and FIGS. 1B and 1C are plan views showing a part of the long medium 1 between the start end SE and the final end FE, respectively.

As shown in these drawings, the long medium 1 according to the present embodiment is formed in a strip shape in which long sides are much longer than short sides, and includes the start end SE and the final end FE which are two short sides, and a first side edge LS1 and a second side edge LS2 which connect the start end SE and the final end FE. The first side edge LS1 connects the start end SE and the final end FE of the long medium 1 at one end portion in a short direction of the long medium 1. The second side edge LS2 connects the start end SE and the final end FE of the long medium 1 at the other end portion in the short direction of the long medium 1. In the present embodiment, the first side edge LS1 and the second side edge LS2 respectively include main portions formed in a linear shape, and are sometimes referred to as a first long side LS1 (an example of the "first side edge portion") and a second long side LS2 (an example of the "second side edge portion"), respectively.

However, the long medium is not limited to the shape shown in the present embodiment. For example, at least one of the two side edges of the long medium may be formed to have minute projections and recesses, rather than being formed to be straight as in the present embodiment. At least one of the two side edges of the long medium may be formed with serrations. Alternatively, at least one of the two side edges of the long medium may be formed into a curved wavy shape. Furthermore, only a part of the side edge of the long medium (for example, only an area around the start end portion or an area around the final end portion) may be formed to have an uneven shape or the like as described above.

The long medium 1 is typically used by being wound around a paper tube in a roll shape. The start end SE of the long medium 1 corresponds to an end portion in a longitudinal direction that is first used, and the final end FE of the long medium 1 corresponds to an end portion in the longitudinal direction that is last used. In a state in which the long medium 1 is wound in a roll shape, the start end SE corresponds to one end (short side) on an outer diameter side of the roll shape, and the final end FE corresponds to the other end (short side) on an inner diameter side (paper tube side) of the roll shape. In the present specification, a direction in which the first side edge (first long side LS1) and the second side edge (second long side LS2) extend may be referred to as a long side direction (the "long side direction" may also be referred to as the "longitudinal direction"), and a direction in which the first side edge and the second side edge are connected (direction parallel to the start end SE and the final end FE in the present embodiment) may be referred to as a short side direction (the "short side direction" may also be referred to as the "short direction"). In the long side direction or the longitudinal direction, a direction in which the start end SE is present with respect to an object may be referred to as a "start end SE direction" or a "start end SE side," and a direction in which the final end FE is present with respect to an object may be referred to as a "final end FE direction" or a "final end FE side." Depending on the main use, a length in the short direction of the long medium 1, that is, a length of each of the start end SE and the final end FE, may be, for example, 5 cm or more and 50 cm or less, and a length in the longitudinal direction of the long medium 1, that is, a length of each of the first long side LS1 and the second long side LS2, may be, for example, 1 m or more and 20 m or less.

The long medium 1 according to the present embodiment includes a release paper RS and an adhesive sheet AS temporarily adhered to the release paper RS. The adhesive sheet AS has a region in which patterns or characters are printed. A length in the short side direction of the adhesive sheet AS is smaller than a length in the short side direction of the release paper RS, and the adhesive sheet AS is temporarily attached to a center portion of the release paper RS in the short side direction. Therefore, both end portions in the short side direction of the release paper RS are exposed without being covered with the adhesive sheet AS. In the present embodiment, one end portion in the short side direction of the release paper RS exposed without being covered with the adhesive sheet AS and having the first side edge (first long side LS1) may be referred to as the first side edge portion. Further, the other end portion in the short side direction of the release paper RS exposed without being covered with the adhesive sheet AS and having the second side edge (second long side LS2) may be referred to as the second side edge portion.

Various holes formed in the long medium 1 according to the present embodiment are formed at both exposed end portions of the release paper RS in the short side direction. First, various holes formed along the first long side LS1, which is an example of the first side edge portion, will be described. In order to prevent excessive complication of the drawings, some of the holes may not be denoted by reference numerals.

[First Reference Holes and First Conveyance Holes]

First reference holes RH1 are holes formed along the first long side LS1 of the long medium 1 at a constant first pitch P1 (hereinafter, a value of the first pitch P1 may be simply referred to as P1. The same also applies to other pitches) from the start end SE to the final end FE. As will be described later, the user can grasp an approximate remaining amount of the long medium 1 based on positions of first index holes IH1 with respect to the first reference holes RH1. Each of regions obtained by virtually dividing the long medium 1 in the longitudinal direction at positions where the first reference holes RH1 and second reference holes RH2 to be described later are formed may be referred to as a division, segment, or section.

FIG. 1A shows segments from a 0th segment S0 including the final end FE to a first segment S1, a second segment S2, and a (part of) third segment S3, FIG. 1B shows segments from (a part of) the second segment S2 to the third segment S3, a fourth segment S4, and a (part of) fifth segment S5, and FIG. 1C shows segments from (a part of) the fifth segment S5 to a sixth segment S6, a seventh segment S7, and (a part of) an eighth segment S8. As shown in FIG. 1A, depending on a manufacturing process and the like, a segment including the final end FE and a segment including the start end SE may have a length less than the first pitch P1. A value obtained by multiplying the first pitch P1 by the number of segments corresponds to an approximate total length of the long medium 1 (length in the longitudinal direction of the first long side LS1 and the second long side LS2) (however, this is an approximate number because a segment having a length less than the first pitch P1 may be provided at the start end SE and/or the final end FE).

First conveyance holes TH1 are holes formed at a constant second pitch P2 smaller than the first pitch P1 from the start end SE to the final end FE along the first long side LS1 of the long medium 1. The first conveyance holes TH1 are holes formed at the constant second pitch P2 smaller than the first pitch P1, and may be used for conveying the long medium 1, and may be used, for example, as holes for engaging with a sprocket 20 provided in the cutting device 2 to be described later. The first conveyance holes TH1 according to the present embodiment are formed at the same positions as the first reference holes RH1 in the short side direction.

In the present embodiment, as illustrated in FIGS. 1A to 1D and the like, between each pair of adjacent first reference holes RH1, 16 first conveyance holes TH1 are formed. The number 16 is an example of "N". In other words, in the present embodiment, the first pitch P1 is N times (16 times) or approximately N times (approximately 16 times) the second pitch P2. In the present embodiment, in order to enable the two holes to be distinguished, each of the first reference holes RH1 is formed to be long in the short side direction and short in the long side direction, while each of the first conveyance holes TH1 is formed to be circular.

Here, by forming the first reference hole RH1 in a shape that is long in the short side direction and short in the long side direction, it becomes easier to grasp a position of the first reference hole RH1 in the long side direction, and therefore it becomes easier to grasp a position of the first index hole IH1 in the long side direction with respect to the first reference hole RH1. Therefore, the user can easily grasp the approximate remaining amount of the long medium 1.

However, sizes of the first pitch P1 and the second pitch P2 and other dimensions of the long medium 1, a formation position, and a shape of each hole are not limited to the example shown in the present embodiment, and can be changed as appropriate depending on the type and application of the long medium. For example, two first conveyance holes TH1 may be formed between each pair of adjacent first reference holes RH1, or the first conveyance holes TH1 may be formed at different positions in the short side direction from the first reference holes RH1.

[First Index Holes]

The first index holes TH1 are holes formed at a constant third pitch P3 smaller than the first pitch P1 from the start end SE to the final end FE along the first long side LS1 of the long medium 1. Here, one first index hole IH1 is formed in each of first index hole forming areas IA1 each having a first length and set between two adjacent first reference holes RH1.

Figure 2A:
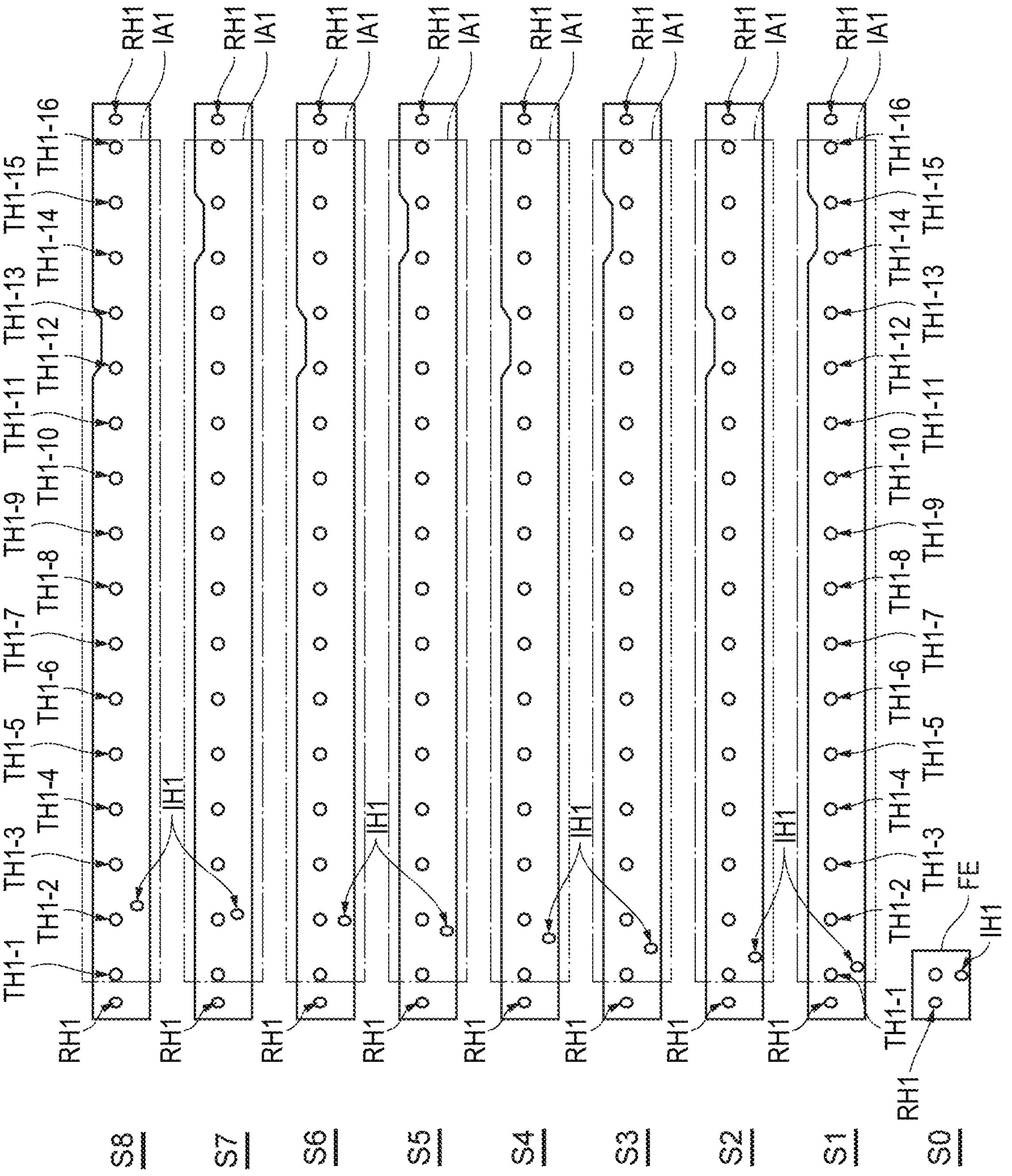
FIG. 2A is a part of the long medium according to the embodiment.

FIG. 2A is a diagram in which an area along the first long side LS1 from the 0th segment S0 to the eighth segment S8 is cut out and aligned in a vertical direction of the paper such that positions of the first reference holes RH1 of the segments are the same in a horizontal direction of the paper which is the short side direction. The first reference hole RH1 on the start end SE side of a certain segment (for example, the first segment S1) is the same hole as the first reference hole RH1 on the final end FE side of a next segment (for example, the second segment S2) adjacent to the start end SE side.

As shown in FIG. 2A, the first index hole forming area IA1 according to the present embodiment is set to an area between the two adjacent first reference holes RH1, from the first conveyance hole TH1 adjacent to the final end FE side of the first reference hole RH1 on the start end SE side to the first conveyance hole TH1 adjacent to the start end SE side of the first reference hole RH1 on the final end FE side of the same segment. Here, in each segment, a first first conveyance hole TH1 adjacent to the final end FE side of the first reference hole RH1 on the start end SE side (left side of the paper) may be referred to as a first conveyance hole TH1-1, a second first conveyance hole TH1 adjacent to this hole on the final end FE side may be referred to as a first conveyance hole TH1-2, and the other first conveyance holes TH1 may be referred to in the same manner. The first conveyance hole TH1 adjacent to the start end SE side of the first reference hole RH1 on the final end FE side (right side of the paper) corresponds to a 16th first conveyance hole TH1 in the present embodiment, and is therefore sometimes referred to as a first conveyance hole TH1-16.

As shown in FIG. 2A, the 16 first conveyance holes TH1 are formed between the two adjacent first reference holes RH1 in the present embodiment, and thus a length of each first index hole forming area IA1 in the long side direction is P2×15 (an example of the "first length"). FIG. 2A and FIGS. 1A to 1D show one first index hole IH1 formed in each of the first index hole forming areas IA1, each of which is set to have the length of P2×15 in each segment.

In such a configuration, the first index holes IH1 are formed at the third pitch P3 different from the first pitch P1, and therefore are formed at different positions relative to the first reference hole RH1 of a segment depending on the segment. For example, the first index hole IH1 (FIG. 2A) formed in the first segment S1 is formed in the first index hole forming area IA1 set in the first segment S1, at a position slightly advanced in the long side direction toward the final end FE relative to the first conveyance hole TH1-1, which is located closest to the start end SE. On the other hand, the first index hole IH1 (FIG. 2A) formed in the second segment S2 is formed in the first index hole forming area IA1 set in the second segment S2 at a position further advanced in the long side direction toward the final end FE relative to the first conveyance hole TH1-1. Similarly, as the segment progresses and the remaining amount of the long medium 1 increases, the position of the first index hole IH1 formed in the first index hole forming area IA1 moves from the end portion on the start end SE side of the first index hole forming area IA1 toward the end portion on the final end FE side. In other words, as the remaining amount of the long medium 1 decreases, the position of the first index hole IH1 formed in the first index hole forming area IA1 moves from the end portion on the final end FE side of the first index hole forming area IA1 toward the end portion on the start end SE side.

With such a configuration, the user can determine the approximate remaining amount of the long medium 1 based on the position of the first index hole IH1 relative to the first reference hole RH1.

Here, the first index hole IH1 is formed at the third pitch P3 smaller than the first pitch P1. For this reason, as shown in FIG. 2A, when the first index hole IH1 is formed in the first index hole forming area IA1 which is closer to the start end SE and farther away from the final end FE, that is, when the first index hole IH1 is formed in a segment from which a large remaining amount of the long medium 1 remains, the first index hole IH1 is formed at a position farther away from the end portion on the start end SE side of the first index hole forming area IA1 in which the first index hole IH1 is formed and closer to the end portion on the final end FE side thereof. In other words, when the first index hole IH1 is formed in the first index hole forming area IA1 which is farther away from the start end SE and closer to the final end FE, that is, when the first index hole IH1 is formed in a segment from which a small remaining amount of the long medium 1 remains, the first index hole IH1 is formed at a position closer to the end portion on the start end SE side of the first index hole forming area IA1 in which the first index hole IH1 is formed and farther away from the end portion on the final end FE side thereof. In order to prevent a second first index hole IH1 from being formed in the first index hole forming area IA1 in which the first index hole IH1 is formed at a position close to the end portion on the start end SE side, the third pitch P3 is preferably larger than a difference between the first pitch P1 and the second pitch P2, which is the length of the first index hole forming area IA1 in the long side direction, that is, (P1-P2).

With such a configuration, the user can grasp that the remaining amount of long medium 1 is decreasing as the first index hole IH1 is closes to the first reference hole RH1 on the start end SE side, or as the first index hole IH1 is farther away from the first reference hole RH1 on the final end FE side.

The first index hole forming area IA1 in the present embodiment is set to most of the area between the two adjacent first reference holes RH1, that is, an area from the first conveyance hole TH1 (in the present embodiment, the first conveyance hole TH1-1) adjacent to the final end FE side of the first reference hole RH1 on the start end SE side to the first conveyance hole TH1 (in the present embodiment, the first conveyance hole TH1-16. Here, the first conveyance hole TH1-16 is an example of the "Nth first conveyance hole.") adjacent to the start end SE side of the first reference hole RH1 on the final end FE side.

For example, the first index hole IH1 (FIGS. 1A and 2A) formed in the 0th segment S0 is formed at the same position in the long side direction as the first conveyance hole TH1 positioned closest to the start end SE in the same segment, the first index hole IH1 formed in the first segment S1 is formed at a position slightly advanced toward the final end FE in the long side direction from the first conveyance hole TH1-1 positioned closest to the start end SE in the first index hole forming area IA1 set in the first segment S1. Similarly, when the first index hole IH1 is formed at a position where the long medium 1 is used and the remaining amount is smaller, the first index hole IH1 is formed at a position closer to the first reference hole RH1 on the final end FE side, and the first index hole IH1 formed in the 93rd segment S93 shown in FIG. 1D is formed at the same position (at a position adjacent thereto) in the long side direction as the first conveyance hole TH1, which is located closest to the final end FE in the first index hole forming area IA1 set in the 93rd segment S93.

With such a configuration, it is possible to indicate the remaining amount of the long medium 1 by using the area having the length of (P2×15) from first conveyance hole TH1-1 to the first conveyance hole TH1-16, which corresponds to most of the area between two adjacent first reference holes RH1. Therefore, the user can relatively accurately grasp the approximate remaining amount of the long medium 1.

However, the long medium 1 according to the present embodiment is not necessarily wound around the paper tube from the segment S0 illustrated in FIG. 1A. For example, the long medium 1 may be wound onto the paper tube from a segment having a configuration corresponding to any segment between the segment S0 and the segment S93 (for example, a segment having a configuration corresponding to the segment S4 shown in FIG. 1B). Even with such a configuration, as will be understood by those skilled in the art, the user can grasp the approximate remaining amount or used amount of the long medium 1.

Similarly, the long medium 1 according to the present embodiment does not necessarily require the segment S93 illustrated in FIG. 1D to have a start end. For example, the long medium 1 may be configured such that the segment (for example, a segment having a configuration corresponding to a 50th segment) having the configuration corresponding to any segment provided between the segment S0 and the segment S93 is the start end SE. Even with such a configuration, as will be understood by those skilled in the art, the user can grasp the approximate remaining amount or used amount of the long medium 1.

Similarly, the long medium 1 according to the present embodiment may be configured such that the long medium 1 is wound around the paper tube from any segment provided between the segment S0 and the segment S93, and any segment is the start end SE. Even with such a configuration, as will be understood by those skilled in the art, the user can grasp the approximate remaining amount or used amount of the long medium 1.

In the above configuration, the area of length (P2×15) from the first conveyance hole TH1-1 to the first conveyance hole TH1-16 is assigned to approximately the total length of the long medium 1, so by using the first conveyance hole TH1 as a scale, the user can grasp the approximate remaining amount of the long medium 1 as a length rather than a ratio.

Here, a value (an example of a "first reference length") obtained by dividing the total length of the long medium 1 from the start end SE to the final end FE by (N−1) (in which N is the number of the first conveyance holes TH1 formed between the adjacent first reference holes RH1) corresponds to the second pitch P2 which is one graduation of the first conveyance hole TH1. That is, the user can use the value obtained by dividing the second pitch P2 by the first reference length (which in the present embodiment corresponds to about 1 m, which is a value obtained by dividing the total length (about 15 mm in the present embodiment) of the long medium 1 by (N−1) (15 in the present embodiment)) as a first scale to grasp the remaining amount or used amount of the long medium 1. For example, when the second pitch P2 is 10 mm, the first scale (an example of a "first scale") is 10 mm/about 1000 mm=about 1/100.

That is, when the first reference length is L1 and the first scale is S1, S1=P2/L1 is satisfied.

Therefore, when the first index hole IH1 formed in a currently used segment is formed, for example, near the 14th first conveyance hole TH1-14 (FIG. 2A) counted from the start end SE side in the first index hole forming area IA1, there are 13 graduations away from the first conveyance hole TH1-1, which is closest to the start end SE, and thus the user can grasp that the remaining amount of the long medium 1 is about 13 m. Similarly, when the first index hole IH1 is formed, for example, near the second first conveyance hole TH1-2 counted from the start end SE side in the first index hole forming area IA1, there is one graduation away from the first conveyance hole TH1-1 closest to the start end SE, and thus it is possible to grasp that the remaining amount of the long medium 1 is approaching about 1 m.

Here, by setting the third pitch P3 as a difference (for example, about 158.4 mm when the first pitch P1 is about 160 mm) between the first pitch P1 and a value (for example, about 1.6 mm when the first pitch P1 is about 160 mm) obtained by multiplying the first scale S1 (a value obtained by dividing the second pitch P2 by the first reference length L1) described above by a value of the first pitch P1, that is, by setting P3=(P1−P1×S1), it is possible to indicate the remaining amount of the long medium 1 with more accuracy.

In other words, by setting S1=P2/L1=(P1−P3)/P1, the remaining amount of the long medium 1 can be more accurately indicated.

In the above embodiment, although the first reference length L1 is set as a value obtained by dividing the total length of the long medium 1 from the start end SE to the final end FE by (N−1) (in which N is the number of first conveyance holes TH1 formed between the adjacent first reference holes RH1), the first reference length L1 is not limited to this.

For example, the first reference length L1 may be set to 1 m regardless of the length of the long medium. According to such a setting method, the user can use P2/L1, which is a value obtained by dividing the second pitch P2 by 1 m, as the first scale S1 to grasp the remaining amount or used amount of the long medium. For example, even if the first reference length L1 is set to 1 m for a long medium having a total length of 5 m, the user can grasp the remaining amount or used amount of the long medium based on the first scale S1 (=P2/L1), in which the second pitch P2, which is one graduation of the first conveyance hole TH1, corresponds to 1 m.

Similarly, the first reference length L1 may be set to any value taking into consideration the application of the long medium and an expected user, and may be, for example, 50 cm, 2 m, or 1 foot (about 30 cm).

Similarly, the length of the long medium may be any value such as 5 m or 10 m.

[Second Reference Hole and Second Conveyance Hole]

Next, various holes formed along the second long side LS2, which is an example of the second side edge portion, will be described.

A second reference hole RH2 is a hole formed at the constant first pitch P1 from the start end SE to the final end FE along the second long side LS2 of the long medium 1. As will be described later, the user can grasp a detailed remaining amount of the long medium 1 based on a position of a second index hole IH2 with respect to the second reference hole RH2. As illustrated in FIG. 1A and the like, the second reference hole RH2 may be formed at the same position as the first reference hole RH1 in the long side direction.

Second conveyance holes TH2 are holes formed at the second pitch P2 from the start end SE to the final end FE along the second long side LS2 of the long medium 1. Each of the second conveyance holes TH2 may be used for conveying the long medium 1, and may be, for example, a hole for engagement with the sprocket 20 of the cutting device 2. As illustrated in FIG. 1A and the like, the second conveyance hole TH2 may be formed at the same position as the first conveyance hole TH1 in the long side direction. Further, the second conveyance hole TH2 may be formed at the same position as the second reference hole RH2 in the short side direction. In the present embodiment, as illustrated in FIGS. 1A to 1D and the like, 16 (an example of "N") second conveyance holes TH2 are formed between two adjacent second reference holes RH2. Similarly to the first reference hole RH1 and the like, the second reference hole RH2 is formed in a shape that is long in the short side direction and short in the long side direction, and the second conveyance hole TH2 is formed in a circular shape.

[Second Index Holes]

The long medium has various colors and include various materials. For this reason, the user may select an appropriate long medium each time depending on the intended use, and may be mounted or installed in a device such as the cutting device 2 to be described later. Further, even when the same long medium is used continuously, many users remove the long medium from a device after use and store the long medium in a plastic bag or the like to prevent dust, dirt, or the like from adhering to a surface thereof. In addition, even if the remaining amount of the long medium is small, some users store several pieces of the long media instead of discarding the long medium in order to use the long medium for printing short patterns or the like. A task of replacing the long medium from the device in this way does not only occur when all the long media have been used up, but can occur frequently on a daily basis, and each time this occurs the user has to grasp the remaining amount of the long medium at that time.

The inventors of the present application have focused on the problem that there is a case in which the remaining amount of the long medium 1 is not sufficiently shown only by the first index holes IH1. For example, in a case in which a pattern having a length of 1.55 m is to be printed on the long medium 1, if the first index hole IH1 is formed near the third first conveyance hole TH1-3 (FIG. 2A) counted from the start end SE side in the first index hole forming area IA1, it can be understood that the remaining amount of the long medium 1 is about 2 m, so that it can be understood that the pattern of 1.55 m can be printed, and on the other hand, if the first index hole IH1 is formed near the second first conveyance hole TH1-2 counted from the start end SE side in the first index hole forming area IA1, it can be understood that the remaining amount of the long medium 1 is about 1 m, so that it can be understood that the remaining amount of the long medium 1 is insufficient for printing the pattern of 1.55 m. However, when the first index hole IH1 is formed near a middle between the first conveyance hole TH1-2 and the first conveyance hole TH1-3, the user cannot accurately grasp whether the remaining amount of the long medium 1 is 1.55 m or more. Further, if the remaining amount of the long medium 1 is actually less than 1.55 m but the printing of the pattern of 1.55 m is forced, a large amount of ink, the long medium 1, and a printing time required for the printing will be wasted, so that if it is difficult for the user to accurately grasp whether the remaining amount of the long medium 1 is 1.55 m or more, the user has no choice but to set a new long medium 1 in the printer and use the new long medium 1. Therefore, the inventors of the present application have come up with the idea of providing the second index holes IH2 in the long medium 1 as a configuration for grasping the remaining amount in more detail after much trial and error.

The second index holes IH2 are holes formed from the start end SE to the final end FE along the second long side LS2 of the long medium 1. Here, one second index hole IH2 is formed in each of second index hole forming areas IA2 each having a second length smaller than the first length and set between two adjacent second reference holes RH2.

Figure 2B:
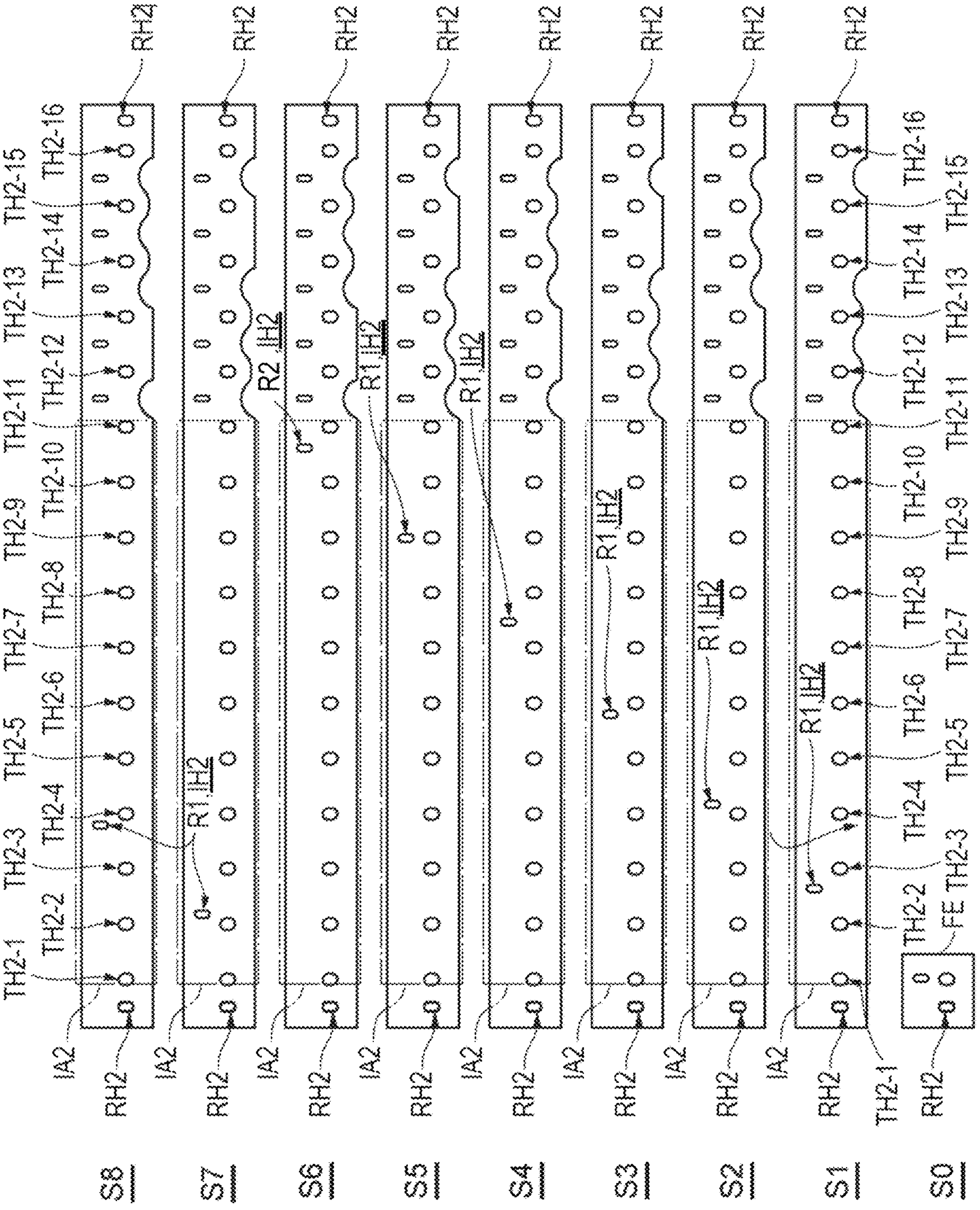
FIG. 2B is a part of the long medium according to the embodiment.

FIG. 2B is a diagram in which an area along the second long side LS2 from the 0th segment S0 to the eighth segment S8 is cut out and aligned in a vertical direction of the paper such that positions of the second reference holes RH2 of the segments are the same in a horizontal direction of the paper. The second reference hole RH2 on the start end SE side of a certain segment (for example, the first segment S1) is the same hole as the second reference hole RH2 on the final end FE side of a segment (for example, the second segment S2) adjacent to the start end SE side. As shown in FIG. 2B, as the long medium 1 is used, that is, as proceeding from the eighth segment S8 to the 0th segment S0, the second index holes IH2 are formed so as to move at an equal pitch (fourth pitch P4) within the second index hole forming areas IA2 from the final end FE side to the start end SE side, and then move again at an equal pitch (fourth pitch P4) from the final end FE side to the start end SE side, so that the second index holes IH2 are holes that are formed so as to circulate (loop) many times within the second index hole forming areas IA2 as the long medium 1 is used.

As compared with FIG. 2A, the second index hole IH2 is provided with a pitch so as to largely move when the long medium 1 is used in the same amount as compared with the first index hole IH1, making it possible to display the remaining amount of the long medium 1 in more detail. Further, the second index holes IH2 are formed so as to circulate in the second index hole forming areas IA2 several times, as compared to the first index holes IH1 which do not circulate through the first index hole forming areas IA1. The details will be described below.

As shown in FIG. 2B, the second index hole forming area IA2 in the present embodiment is set to an area between the two adjacent second reference holes RH2, which is shorter in the long side direction than an area from the second conveyance hole TH2 adjacent to the final end FE side of the second reference hole RH2 on the start end SE side to the second conveyance hole TH2 adjacent to the start end SE side of the second reference hole RH2 on the final end FE side.

Therefore, it is possible to provide a type display portion TR by utilizing an area along the second long side LS other than the second index hole forming area IA2.

Here, as shown in FIG. 2B, in each segment, a first second conveyance hole TH2 adjacent to the final end FE side of the second reference hole RH2 on the start end SE side (left side of the paper) may be referred to as a second conveyance hole TH2-1, a second second conveyance hole TH2 adjacent to this hole on the final end FE side may be referred to as a second conveyance hole TH2-2, and the other second conveyance holes TH2 may be referred to in the same manner.

In the present embodiment, the second index hole forming areas IA2 is set to an area extending from the second conveyance hole TH2-1, which is the first second conveyance hole TH2 adjacent to the final end FE side of the second reference hole RH2 on the start end SE side (left side of the paper), proceeding in the direction of the final end FE to the second conveyance hole TH2-11, which is the 11th (an example of "Mth," in which M=11) second conveyance hole TH2. Therefore, a length of each second index hole forming area IA2 in the long side direction is P2×10. This is an example of a "second length". FIG. 2B and FIGS. 1A to 1D show one second index hole IH2 formed in each of the second index hole forming areas IA2, each of which is set to have the length of P2×10 in each segment.

Here, the second index hole IH2 is formed by alternately forming a plurality of first circulating holes R1 formed continuously at the fourth pitch P4 smaller than the third pitch P3 with respect to the second index hole IH2 adjacent to the start end SE side and a second circulating hole R2 formed at a fifth pitch P5 larger than the first pitch P1 with respect to the first circulating hole R1 adjacent to the start end SE side.

For example, the second index hole IH2 formed in the second index hole forming area IA2 in the first segment S1 is formed at a position advanced toward the final end FE of the fourth pitch P4 with respect to the second index hole IH2 in the second segment S2 adjacent to the start end SE (FIG. 1A), the second index hole IH2 formed in the second index hole forming area IA2 in the second segment S2 is formed at a position advanced toward the final end FE of the fourth pitch P4 with respect to the second index hole IH2 in the third segment S3 adjacent to the start end SE side, and the second index hole IH2 formed in the second index hole forming area IA2 in the third segment S3 is formed at a position advanced toward the final end FE of the fourth pitch P4 with respect to the second index hole IH2 in the fourth segment S4 adjacent to the start end SE side (FIG. 1B).

Similarly, the second index holes IH2 respectively formed in the second index hole forming areas IA2 in the fourth segment S4 and the fifth segment S5 are formed at positions advanced toward the final end FE of the fourth pitch P4 with respect to the second index holes IH2 adjacent to the start end SE side.

Therefore, the total of five second index holes IH2 (an example of "the plurality of first circulating holes") respectively formed in the first segment S1 to the fifth segment S5 are the first circulating holes R1.

On the other hand, as shown in FIG. 1C, the second index hole IH2 formed in the second index hole forming area IA2 in the sixth segment S6 is formed at a position advanced toward the final end FE of the fifth pitch P5 larger than the first pitch P1 with respect to the second index hole IH2, which is the first circulating hole R1 and formed in the second index hole forming area IA2 in the seventh segment S7 adjacent to the start end SE side.

Therefore, the one second index hole IH2 formed in the sixth segment S6 is the second circulating hole R2.

The second index holes IH2 respectively formed in the second index hole forming areas IA2 of the seventh segment S7 and the eighth segment S8 are formed at positions advanced toward the final end FE of the fourth pitch P4 with respect to the second index hole IH2 which is the second circulating hole R2 adjacent to the start end SE side. Similarly, the second index holes IH2 respectively formed in the second index hole forming areas IA2 of the ninth segment, the 10th segment, and the 11th segment are formed at positions advanced toward the final end FE of the fourth pitch P4 with respect to the second index holes IH2 respectively formed in the eighth segment, the ninth segment, and the 10th segment respectively adjacent to the start end SE side.

Therefore, the total of five second index holes IH2 (an example of "the plurality of first circulating holes") respectively formed in the seventh segment S7 to the 11th segment S11 are the first circulating holes R1.

On the other hand, the second index hole IH2 formed in the second index hole forming area IA2 in the 12th segment is formed at a position advanced toward the final end FE of the fifth pitch P5 with respect to the second index hole IH2 which is the first circulating hole R1 formed in the second index hole forming area IA2 in the 13th segment adjacent to the start end SE side.

Therefore, one second index hole IH2 formed in the 12th segment is the second circulating hole R2.

As described above, the second index holes IH2 has a configuration in which the plurality of first circulating holes R1 formed at the fourth pitch P4 smaller than the third pitch P3 with respect to the second index hole IH2 adjacent to the start end SE side and the second circulating hole R2 formed at the fifth pitch P5 larger than the first pitch P1 with respect to the first circulating hole R1 adjacent to the start end SE side are alternately provided. As will be understood by those skilled in the art, the number of the first circulating holes R1 between the adjacent second circulating holes R2 may not be constant. In the present embodiment, there are five to six.

As a result of this configuration, as the long medium 1 is used, repetition is made in which the second index holes IH2 are formed so as to move at an equal pitch in the second index hole forming areas IA2 from the final end FE side to the start end SE side, and when the second index hole IH2 reaches the vicinity of an end portion on the start end SE side of the second index hole forming area IA2, the second index hole IH2 moves at the large fifth pitch and returns to the vicinity of an end portion on the final end FE side of the second index hole forming area IA2; and then the second index holes IH2 moves again at the equal pitch in the second index hole forming areas IA2 from the final end FE side to the start end SE side, and when the second index hole IH2 reaches the vicinity of the end portion on the start end SE side of the second index hole forming area IA2, the second index hole IH2 again moves at the large pitch and returns to the vicinity of the end portion on the final end FE side of the second index hole forming area IA2. That is, the second index holes IH2 are formed so as to circulate (loop) many times in the second index hole forming areas IA2.

As shown in FIG. 2B, among the plurality of (in the present embodiment, five or six) first circulating holes R1 formed between the adjacent second circulating holes R2, when the first circulating hole R1 (for example, the first circulating hole R1 formed in the first segment S1) is formed in a second index hole forming area IA2 that is closer to the start end SE and farther away from the final end FE, such a second index hole IH2 is formed at a position that is farther away from the end portion on the start end SE side and closer to the end portion on the final end FE side of the second index hole forming area IA2. In other words, when the first circulating hole R1 (for example, the first circulating hole R1 formed in the first segment S1) is formed in a second index hole forming area IA2 that is closer to the final end FE and farther away from the start end SE, such a second index hole IH2 is formed at a position that is farther away from the end portion on the final end FE side and closer to the end portion on the start end SE side of the second index hole forming area IA2.

The second circulating hole R2, which is adjacent to the start end SE side of the plurality of first circulating holes R1, is formed at a position further away from the end portion on the start end SE side and closer to the end portion on the final end FE side than the plurality of first circulating holes R1.

In other words, the second index hole IH2 is formed at a position advanced toward the final end FE side of the fourth pitch with respect to the second index hole IH2 adjacent to the start end SE side, so that the second index hole IH2 is formed to move in the second index hole forming area IA2 from the final end FE side to the start end SE side as the remaining amount of the long medium 1 decreases. However, when the position advanced toward the final end FE side of the fourth pitch with respect to the second index hole IH2 adjacent to the start end SE side is positioned outside the second index hole forming area IA2, the second index hole IH2 is formed at a position advanced toward the final end FE side of the fifth pitch with respect to the second index hole IH2 adjacent to the start end SE side, so that the second index hole IH2 is again provided so as to return to the position close to the final end FE side in the second index hole forming area IA2.

With such a configuration, it is possible to indicate the detailed remaining amount of the long medium 1 by using the area between the two adjacent second reference holes RH2, which has a length of P2×10 from the second conveyance hole TH2-1 to the second conveyance hole TH2-11. Here, since the fourth pitch P4 is smaller than the third pitch P3, that is, since it is possible to form the second index hole IH2 at a position different from that of the first index hole IH1 when the same amount of long medium 1 is used, the user can grasp the remaining amount of long medium 1 in more detail compared to the case in which only a single first index hole IH1 is formed.

Here, the fourth pitch P4 is set based on a second scale in which the length P2×10 from the second conveyance hole TH2-1 to the second conveyance hole TH2-11, which is assigned as the second index hole forming area IA2, becomes the first reference length described above. That is, in the present embodiment, for the first conveyance hole TH1, the remaining amount of the long medium 1 is indicated based on the first scale, which is (P2/first reference length) such that one graduation of the first conveyance hole TH1 corresponds to the first reference length of about 1 m, and for the second conveyance hole TH2, the remaining amount of the long medium 1 is indicated based on the second scale which is P2/second reference length such that the length P2×10 from the second conveyance hole TH2-1 to the second conveyance hole TH2-11 corresponds to the first reference length of about 1 m, that is, such that one graduation of the second conveyance hole TH2 corresponds to the second reference length obtained by dividing the first reference length of about 1 m by (M−1), so that it is possible to indicate the remaining amount of the long medium 1 in more detail.

In the present embodiment, the second index hole forming area IA2 is set from the first second conveyance hole TH2-1 adjacent to the final end FE side of the second reference hole RH2 on the start end SE side to the 11th second conveyance hole TH2-11 counted in the final end FE direction using this second conveyance hole TH2-1 as a reference, so M is 11. Therefore, the second reference length obtained by dividing the first reference length of about 1 m by (M−1) is about 0.1 m. Therefore, the user can grasp the remaining amount of the long medium 1 in detail by setting, as the second scale, a value obtained by dividing the second pitch P2 by about 0.1 m. For example, when the second pitch P2 is 7 mm to 8 mm, the second scale (an example of a "second scale") is 7 mm to 8 mm/about 100 mm=about 1/14 to 1/12.5.

That is, when the second reference length is L2 and the second scale is S2, $L2=L1/(M-1)$ and $S2=P2/L2$.

The fourth pitch P4 is set as a difference (for example, if the first pitch P1 is about 150 mm to 160 mm, then about 137 mm to 150 mm) between the first pitch P1 and a value (for example, if the first pitch P1 is about 150 mm to 160 mm, then about 10 mm to 13 mm) obtained by multiplying the second scale S2 by the value of the first pitch P1, that is, as $P4=(P1-P1\times S2)$, it is possible to indicate the remaining amount of the long medium 1 based on the second reference length L2, which is less than the first reference length L1.

That is, there is a relationship of $S2=P2/L2=(P1-P4)/P1$.

For example, when the first index hole IH1 formed in the currently used segment is formed near the third first conveyance hole TH1-3 (FIG. 2A) counted from the start end SE side within the first index hole forming area IA1, the user can determine that the remaining amount of the long medium 1 is about 2 m, and when the second index hole IH2 formed in the same segment is formed near the third second conveyance hole TH2-3 (FIG. 2B) counted from the start end SE side within the second index hole forming area IA2, there is two graduations from the second conveyance hole TH2-1 closest to the start end SE side, and thus the user can determine that the remaining amount of the long medium 1 is about 2.2 m, which is obtained by adding about 20 cm to about 2 m.

Similarly, when the first index hole IH1 formed in the currently used segment is formed near the second first conveyance hole TH1-2 (FIG. 2A) counted from the start end SE side within the first index hole forming area IA1, the user can determine that the remaining amount of the long medium 1 is about 1 m, and when the second index hole IH2 formed in the same segment is formed near the sixth second conveyance hole TH2-6 (FIG. 2B) counted from the start end SE side within the second index hole forming area IA2, the user can determine that the remaining amount of the long medium 1 is about 1.5 m, which is obtained by adding about 50 cm to about 1 m.

As understood by those skilled in the art, the fifth pitch P5 is a sum of $P2\times(M-1)$ (M=11 in the present embodiment), which is the length of the second index hole forming area IA2, and the fourth pitch P4, that is, $P5=(P2\times(M-1)+P4)$. By providing the fifth pitch P5 in this way, it is possible to form the second index hole IH2 in the second index hole forming area IA2 of a segment adjacent to the final end FE side.

As described above, according to the long medium 1 of the present embodiment, the first index hole IH1 and the second index hole IH2 are formed at different pitches, and thus when the same amount of the long medium 1 is used, it is possible to grasp in detail the remaining amount of the long medium 1 based on the different indexes. Here, the second index hole IH2 has a special configuration in which a plurality of first circulating holes R1 formed continuously at the fourth pitch P4 smaller than the third pitch P3 and the second circulating hole R2 formed at the fifth pitch P5 larger than the first pitch P1 are alternately formed. With such a configuration, despite being formed at the same pitch, the first conveyance holes TH1 formed along the first side edge portion (first long side LS) can be used for indicating the approximate remaining amount of the long medium 1 based on the first scale S1, and the second conveyance holes TH2 formed along the second side edge portion (second long side LS2) can be used for indicating the detailed remaining amount of the long medium 1 based on the second scale S2.

As a result, the long medium 1 according to the present embodiment is able to exert a unique effect in which the first index hole IH1 indicates a quotient obtained by dividing the long medium 1 by the first reference length L1, and the second index hole IH2 indicates a remainder.

In the present embodiment, a decimal-based representation is achieved by setting M=11, but this is not limited to this. For example, M may be quinary (quarternary notation), novenary (octal notation), or septendecimal (hexadecimal notation).

For example, the present embodiment may be modified such that M=5, 1 m that is the first reference length L1 is divided into four, and one scale between the adjacent second conveyance holes TH2 indicates 25 cm, that is, 1/4.

Further, N=11, that is, N=M may be satisfied. In a configuration in which N=M, a partial area to be described later may not be provided, or a long medium may be configured such that an area from the Mth second conveyance hole TH2 in the segment to the first second conveyance hole TH2 in a segment adjacent to the final end FE side is set as the partial area.

Further, the first index hole forming area IA1 may be shorter than the second index hole forming area IA2. For example, when the length of the long medium is 5 m, a reference length may remain 1 m and the first index hole forming area IA1 may be set to a length (for example, P2×5) shorter than the length of the second index hole forming area IA2.

Further, as will be understood by those skilled in the art, even if the fourth pitch P4 is slightly different from the above value (for example, smaller than the third pitch P3 and within a numerical range of +30% of the above value), it is possible to indicate the remaining amount of the long medium 1 in some detail. The fifth pitch P5 may be changed in accordance with a change in magnitude of the fourth pitch P4.

[Type Display Portion]

Next, the type display portion TR provided in the long medium 1 will be described. The inventors of the present application have focused on the fact that even if the types of long media are different, it is not possible to know the type at a glance, and have come up with the idea of providing a type display portion that displays the type of the long medium on the long medium. Here, in the long medium 1 according to the present embodiment, the second index hole IH2 is provided in the second index hole forming area IA2 having the second length shorter than the first pitch P1. Therefore, the inventors have come up with the idea of providing a type display portion TR and a pinched portion (to be described later) in a partial area PA, which is the remaining area of the second side edge portion of the long medium 1 excluding the second index hole forming area IA2. However, as described above, the long medium may be configured such that the area from the Mth second conveyance hole TH2 in the segment to the first second conveyance hole TH2 in the segment adjacent to the final end FE side is set as the partial area.

The type display portion TR displays the type of the long medium 1. The long medium, including the long medium 1, can be classified based on various criteria, for example, based on a cutting pressure indicating strength of a cutting force for cutting the long medium (and a cutting pressure indicating strength of a cutting force for cutting the adhesive sheet AS and half-cutting the long medium 1 without completely cutting the release paper RS). The type display portion TR according to the present embodiment can be used for displaying the cutting pressure of the long medium 1. However, the present invention is not limited to this, and the type display portion TR may be used for displaying the type of the long medium based on different criteria (for example, a color of the adhesive sheet AS, a material of the long medium, or the like). For example, the type display portion TR may be used for indicate the type based on the material of the long medium, such that one type display hole TRH indicates that the material of the long medium is polyvinyl chloride, and two type display holes TRH indicate PET.

Here, in the long medium 1 according to the present embodiment, the second index hole IH2 is provided in the second index hole forming area IA2 having the second length smaller than the first length, and thus it is possible to provide the type display portion TR and the pinched portion, which will be described later, in the remaining partial area PA excluding the second index hole forming area IA2.

Specifically, the partial area PA is set in an area (however, an area excluding the second index hole forming area IA2) from the second conveyance hole TH2-11, which is the Mth (M=11 in the present embodiment) second conveyance hole TH2, to the second conveyance hole TH2-16, which is the Nth (N=16 in the present embodiment) second conveyance hole TH2, in the area along the second long side LS2 provided in each segment.

Figure 3:
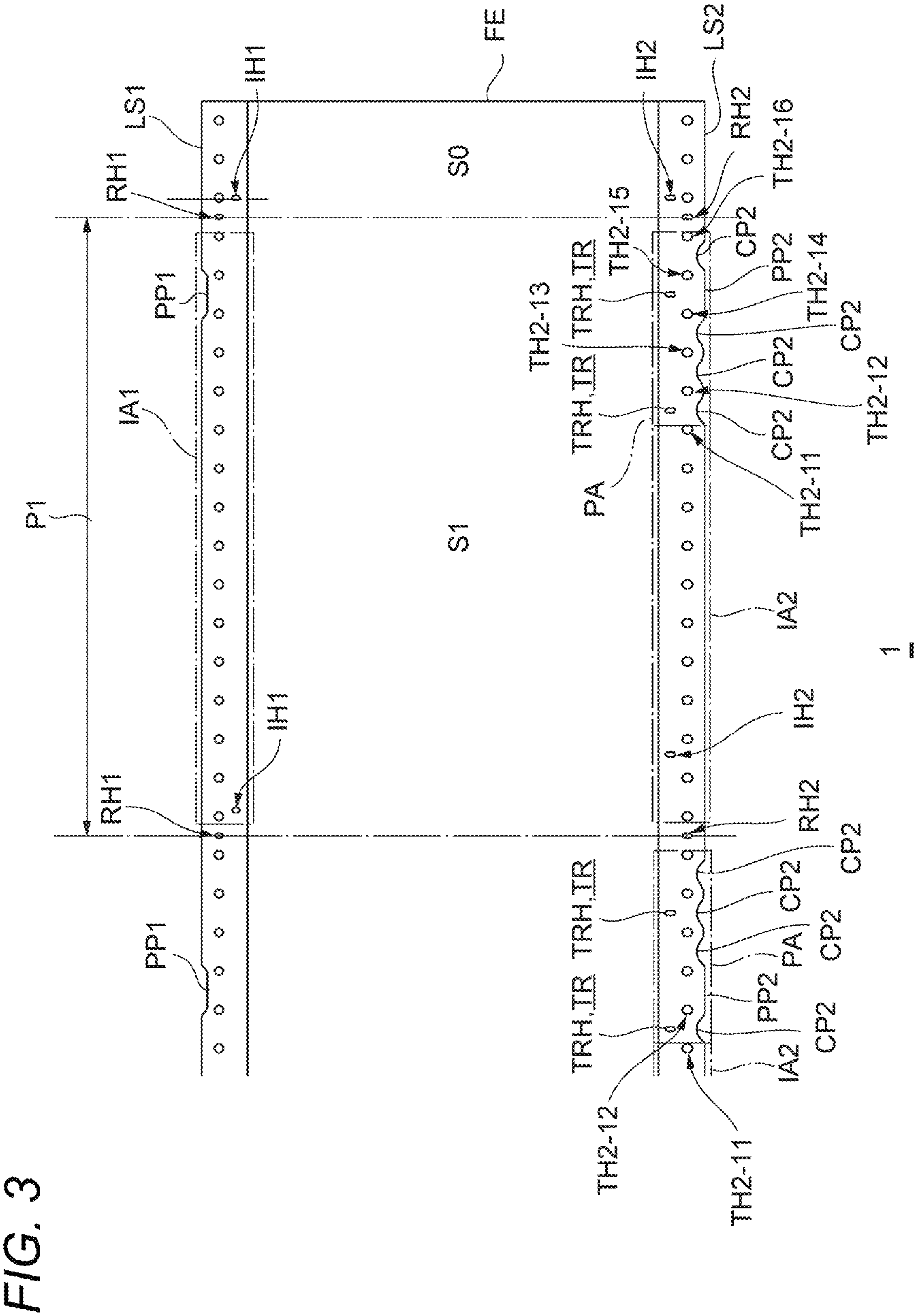
FIG. 3 is a part of the long medium according to the embodiment.

FIG. 3 is a plan view showing a part of the long medium 1 including the final end FE of the long medium 1 according to the present embodiment. As shown in FIG. 3, the partial area PA is set in the area from the second conveyance hole TH2-11 to the second conveyance hole TH2-16 in the long side direction.

The type display portion TR according to the present embodiment is formed as the type display hole TRH. In the present embodiment, the cutting pressure for the long medium is indicated according to a following rule in which when the type display hole TRH is formed between the second conveyance hole TH2-16 and the second conveyance hole TH2-15 in the long side direction, the cutting pressure is “2”, when the type display hole TRH is formed between the second conveyance hole TH2-15 and the second conveyance hole TH2-14, the cutting pressure is “3”, when the type display hole TRH is formed between the second conveyance hole TH2-14 and the second conveyance hole TH2-13, the cutting pressure is “4”, when the type display hole TRH is formed between the second conveyance hole TH2-13 and the second conveyance hole TH2-12, the cutting pressure is “5”, and when the type display hole TRH is formed between the second conveyance hole TH2-12 and the second conveyance hole TH2-11, the cutting pressure of “0.5” is further added.

In FIG. 3, two type display holes TRH are formed between the second conveyance hole TH2-11 and the second conveyance hole TH2-12 and between the second conveyance hole TH2-14 and the second conveyance hole TH2-15 in the long side direction in the segment, and thus it is indicated that a cutting pressure of "3.5" is recommended for the long medium 1. For long media of different types (cutting pressures), it is possible to display the type of the long medium by forming the type display holes TRH in different positions (for example, between the second conveyance hole TH2-12 and the second conveyance hole TH2-13, or between the second conveyance hole TH2-15 and the second conveyance hole TH2-16) and/or in different numbers.

A relationship between the positions and the number of the holes and the cutting pressure may be another relationship.

In the present embodiment, at least one type display hole TRH is formed at an intermediate position in the long side direction between the two adjacent second conveyance holes TH2. Further, as shown in FIG. 3, at least one type display hole TRH may be formed at a position different from the second conveyance hole TH2 in the short side direction.

As described above, the second conveyance hole TH2 and at least one type display hole TRH are formed at different positions in the long side direction. As will be described later, since the long medium 1 is conveyed with the sprocket 20 inserted into the second conveyance hole TH2, when strength around the second conveyance hole TH2 is weak, a drive of the sprocket 20 during the conveyance may tear a periphery of the second conveyance hole TH2, making proper conveyance difficult.

According to the long medium 1 of the present embodiment, it is possible to prevent a situation in which the long medium 1 is broken from the periphery of the second conveyance hole TH2 and the long medium 1 cannot be appropriately conveyed, with the configuration described above.

As shown in FIG. 3, four concave portions CP2 depressed in a direction approaching the first long side LS1 are formed in the second long side LS2 of the partial area PA.

With such a configuration, the user can distinguish between the second index hole forming area IA2 and the partial area PA, and thus it is easy for the user to distinguish between the second index hole IH2 and the type display hole TRH. In particular, as shown in the present embodiment, the second index hole IH2 and the type display hole TRH are formed in the same shape and at the same position in the short side direction, and thus when a hole having the same shape as the second index hole IH2 is seen, it is easy to distinguish between the two based on whether the concave portion CP2 is provided in the second long side LS2.

As the concave portion CP2, a single concave portion CP2 may be provided in the second long side LS2 so as to be recessed across the second long side LS2 of the partial area PA, or two or more concave portions CP may be formed as in the present embodiment. Modifications of the configuration of the second side edge portion in the partial area PA will be described later with reference to FIGS. 4A to 4E.

[Pinched Portion]

Next, a second pinched portion PP2 provided in the long medium 1 will be described. A long medium having a strip shape may have the same pattern or the like printed repeatedly at equal intervals, be cut at equal intervals for each pattern, and divided into rectangle sheets. After that, each sheet with the printed pattern or the like may be stacked and stored in a box or the like. The inventors of the present application have focused on the fact that when the user tries to remove a single sheet in such a stacked state, touching a surface of the sheet will cause the printed portion to become dirty, and have come up with the idea of providing a pinched portion that utilizes a release paper portion to make it easy to remove the single sheet in the stacked state.

The second pinched portion PP2 is a portion for easily pinching and taking out one piece when, for example, the same pattern or the like is repeatedly printed at the first pitch P1 on the long medium 1, the long medium 1 is cut at the first pitch P1 for each pattern, and then the pieces with the printed patterns or the like are stacked and stored. A pinched portion such as the second pinched portion PP2 may be called a tab, a protrusion, or the like.

Specifically, the second pinched portion PP2 that protrudes in a direction away from the first long side LS1 (downward in the paper of FIG. 3) is formed on each second long side LS2 of the partial area PA provided in each segment.

According to such a configuration, compared to a case in which the second long side LS2 is formed in a straight line, the concave portion CP2 provided in the second long side LS2 to distinguish between the second index hole IH2 and the type display hole TRH can also be used as a finger hook, making it possible to pinch the second pinched portion PP2 adjacent to the concave portion CP2 or surroundings thereof, and thus it is easier to pinch and remove a single sheet in a stacked state, which is made while sometimes dirtying or damaging the printed portion since there is no pinched portion in the related art.

A single second pinched portion PP2 may be formed on the second long side LS2, or two or more second pinched portions PP2 may be formed.

The second pinched portion PP2 may be used as the type display portion TR. That is, the second pinched portion PP2 and the like may be used as the type display portion TR by changing the shape and the number of the second pinched portion PP2 and the like according to the type of the long medium.

In the above-described configuration, as shown in FIG. 2A and FIG. 2B, the shapes of two second pinched portions PP2 formed in the adjacent segments (for example, the first segment S1 and the second segment S2) may be different from each other. For example, as shown in FIG. 2A and FIG. 2B, a distance between the second pinched portion PP2 formed on the start end SE side of the first segment S1 and the second reference hole RH2 on the start end SE side of the second pinched portion PP2, and a distance between the second pinched portion PP2 formed on the start end SE side of the second segment S2 and the second reference hole RH2 on the start end SE side of the second pinched portion PP2 may be different from each other.

According to such a configuration, when the long medium is cut at the first pitch P1 and stacked, the second pinched portions PP2 adjacent to each other in the vertical direction are formed at different positions, and since the second pinched portions PP2, which are like tabs, do not overlap with a lower layer, making it easy to pinch and remove one sheet from the stacked sheets after the long medium is cut at the first pitch P1.

As shown in FIG. 3, the first long side LS1 may also be formed with a first pinched portion PP1 having a single (or a plurality of) concave portion recessed in a direction approaching the second long side LS2.

With such a configuration, the long medium 1 can be easily pinched from either the first long side LS1 or the second long side LS2.

Here, similarly to the second pinched portion PP2, a distance between two adjacent segments, for example, a distance between the first pinched portion PP1 formed on the start end SE side of the first segment S1 and the first reference hole RH1 on the start end SE side of the first pinched portion PP1, and a distance between the first pinched portion PP1 formed on the start end SE side of the second segment S2 and the first reference hole RH1 on the start end SE side of the first pinched portion PP1 may be different from each other (FIG. 3).

Further, similarly to the second pinched portion PP2, the first pinched portion PP1 may be provided in a manner of protruding in a direction away from the second long side LS2.

When both the first pinched portion PP1 and the second pinched portion PP2 are formed in the long medium 1 in this manner, a distance (pitch) between two adjacent segments, for example, the first pinched portion PP1 formed on the start end SE side of the first segment S1 and the first pinched portion PP1 formed on the start end SE side of the second segment S2, and a distance (pitch) between the same two segments, for example, the second pinched portion PP2 formed on the start end SE side of the first segment S1 and the second pinched portion PP2 formed on the start end SE side of the second segment S2, may be the same.

In this way, by forming the first pinched portion PP1 and the like such that the first pinched portion and the second pinched portion are synchronized, that is, such that a relative position of the second pinched portion PP2 to the first pinched portion PP1 is the same regardless of the segment, it is also possible to easily pinch and remove one piece from the long medium 1 that has been cut at the first pitch P1 and stacked.

Modification

Hereinafter, modifications of the second side edge portion in the partial area PA will be described with reference to FIG. 4A to 4E (however, the type display hole TRH is omitted).

Figure 4A:
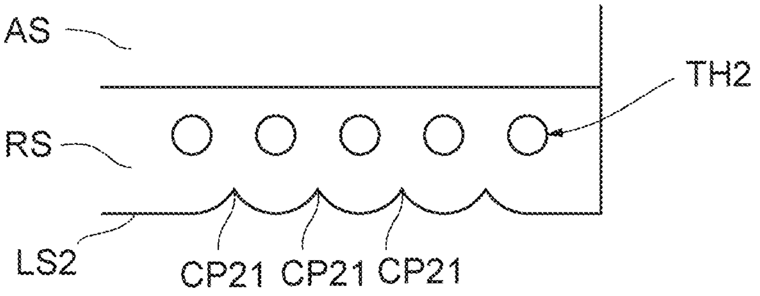
FIGS. 4A to 4E are modifications of the long medium according to the embodiment.

As shown in FIG. 4A, the second side edge portion (second long side LS2) may be provided with a plurality of concave portions CP21 formed by connecting curved lines which are convex (including arcs) in the direction away from the first side edge portion (first long side LS1) to each other.

Figure 4B:
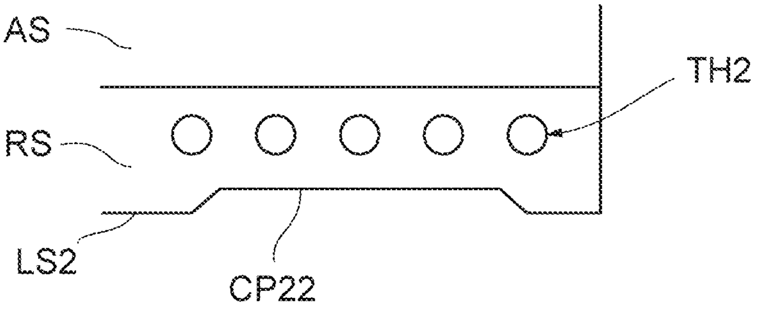

As shown in FIG. 4B, the second side edge portion (second long side LS2) may be provided with a single concave portion CP22 that is formed to be recessed by a certain amount in a direction approaching the first side edge portion (first long side LS1) and extends along the second side edge portion (second long side LS2).

Figure 4C:
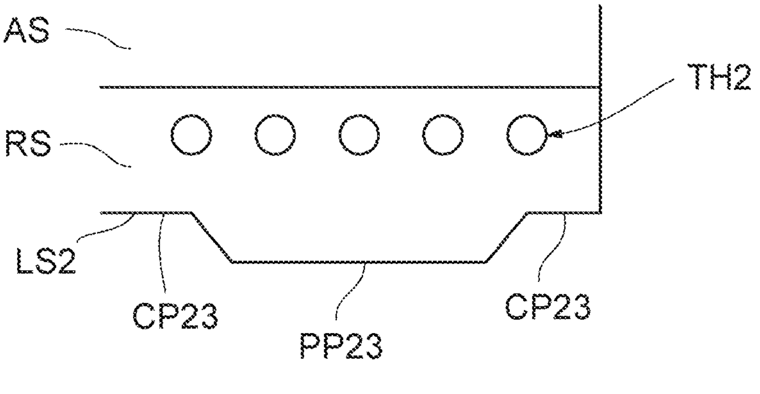

As shown in FIG. 4C, the second side edge portion (second long side LS2) may be provided with a second pinched portion PP23 which is a convex portion which is formed with a constant amount of protrusion in the direction away from the first side edge portion (first long side LS1) and extends along the second side edge portion (second long side LS2), and two concave portions CP23 which are formed at both ends of the second pinched portion PP23.

Figure 4D:
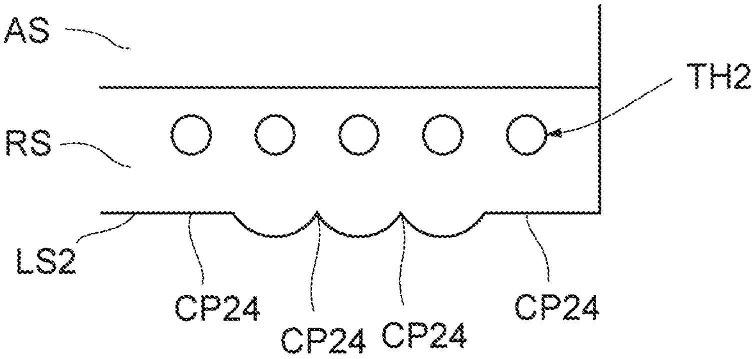

As shown in FIG. 4D, the second side edge portion (the second long side LS2) may be provided with a plurality of concave portions CP24 provided in connection portions that connect curved lines which are convex (including arcs) in a direction away from the first side edge portion (first long side LS1) to one another, and further two concave portions CP24 formed at both ends of the configurations.

Figure 4E:
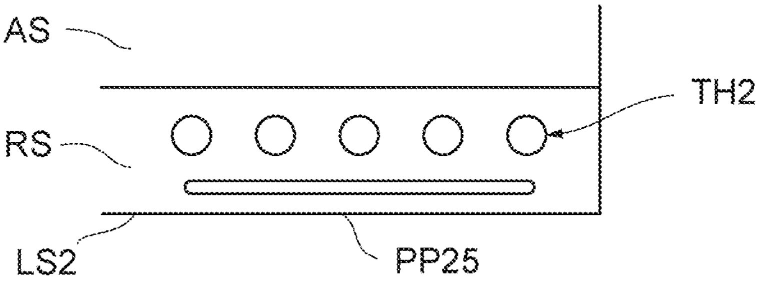

The second pinched portion is not necessarily provided by modifying a shape of the second long side LS2 from a straight line, but may be achieved by another configuration that is easily pinched with fingers of the user. For example, as shown in FIG. 4E, a second pinched portion PP25 may be formed from a hole portion extending along the second long side LS2 between the second long side LS2 and the second conveyance hole TH2.

With such a configuration, the user can easily pinch and remove one piece by pinching an elongated portion between the second long side LS2 and the second pinched portion PP25. Further, since the printing on the adhesive sheet AS has already been completed, even if the release paper RS is torn when the elongated portion is pinched and pulled, it is possible to prevent a possibility of damaging the printed portion of the adhesive sheet AS as well.

Figure 5:
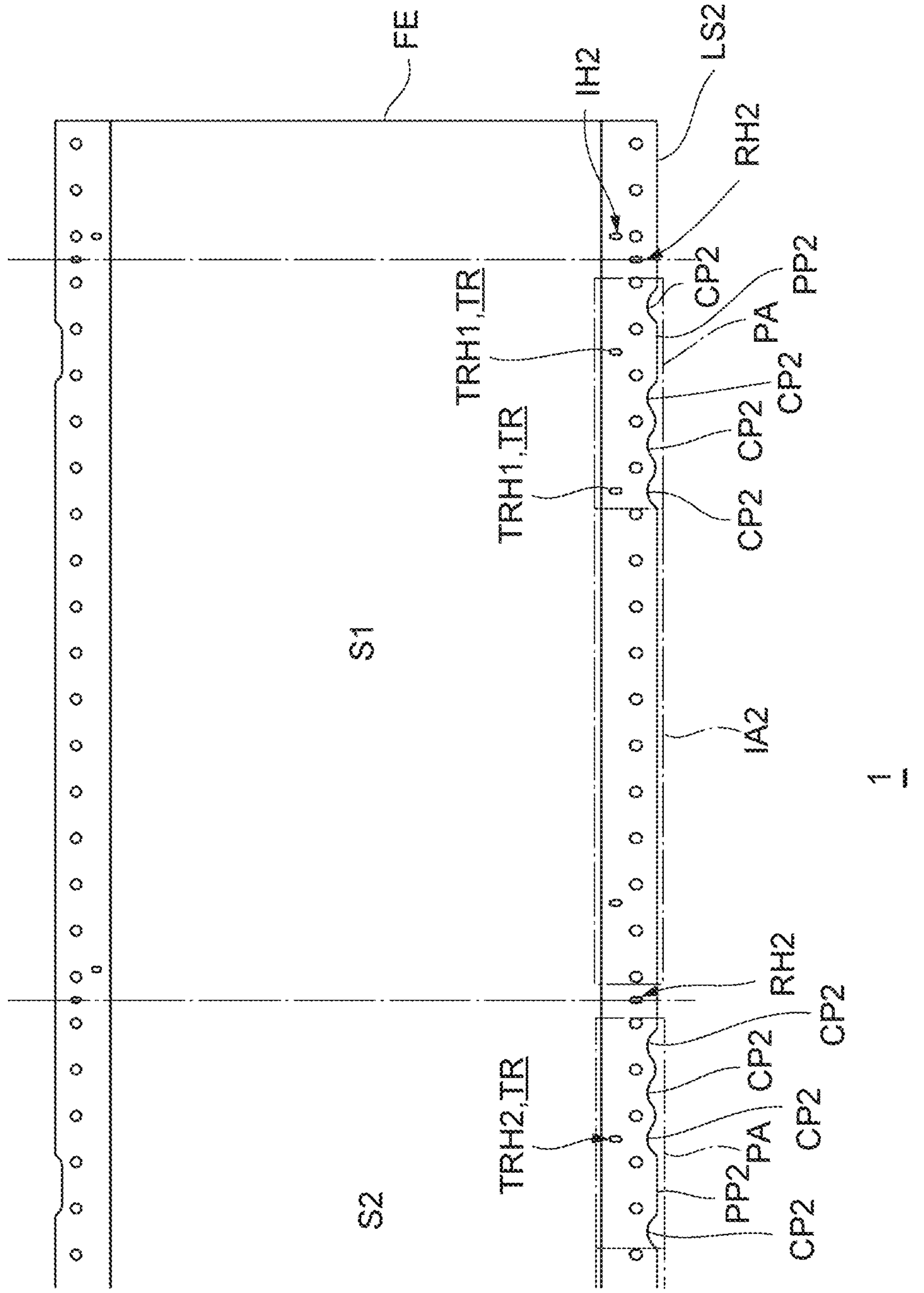
FIG. 5 is a modification of the long medium according to the embodiment.

Further, a further modification of the second side edge portion in the partial area PA will be described with reference to FIG. 5. The inventors of the present application have conceived a configuration for displaying a plurality of types as the type of the long medium. The plurality of types include, for example, cutting pressure (an example of a "first type") and color (an example of a "second type"), but are not limited to this.

Therefore, the inventors have come up with a configuration in which, even for the same long medium 1, the type display hole TRH displays one type depending on a position of the second pinched portion PP2. For example, when the second pinched portion PP2 is provided relatively toward the final end FE as in the first segment S1 of FIG. 5, the type display hole TRH1 of the first segment S1 displays the cutting pressure, and when the second pinched portion PP2 is provided relatively toward the start end SE as in the second segment S2 of FIG. 5, a meaning of the type display hole TRH may be set such that a type display hole TRH2 in the second segment S2 displays a color.

[Cutting Device]

Figure 6:
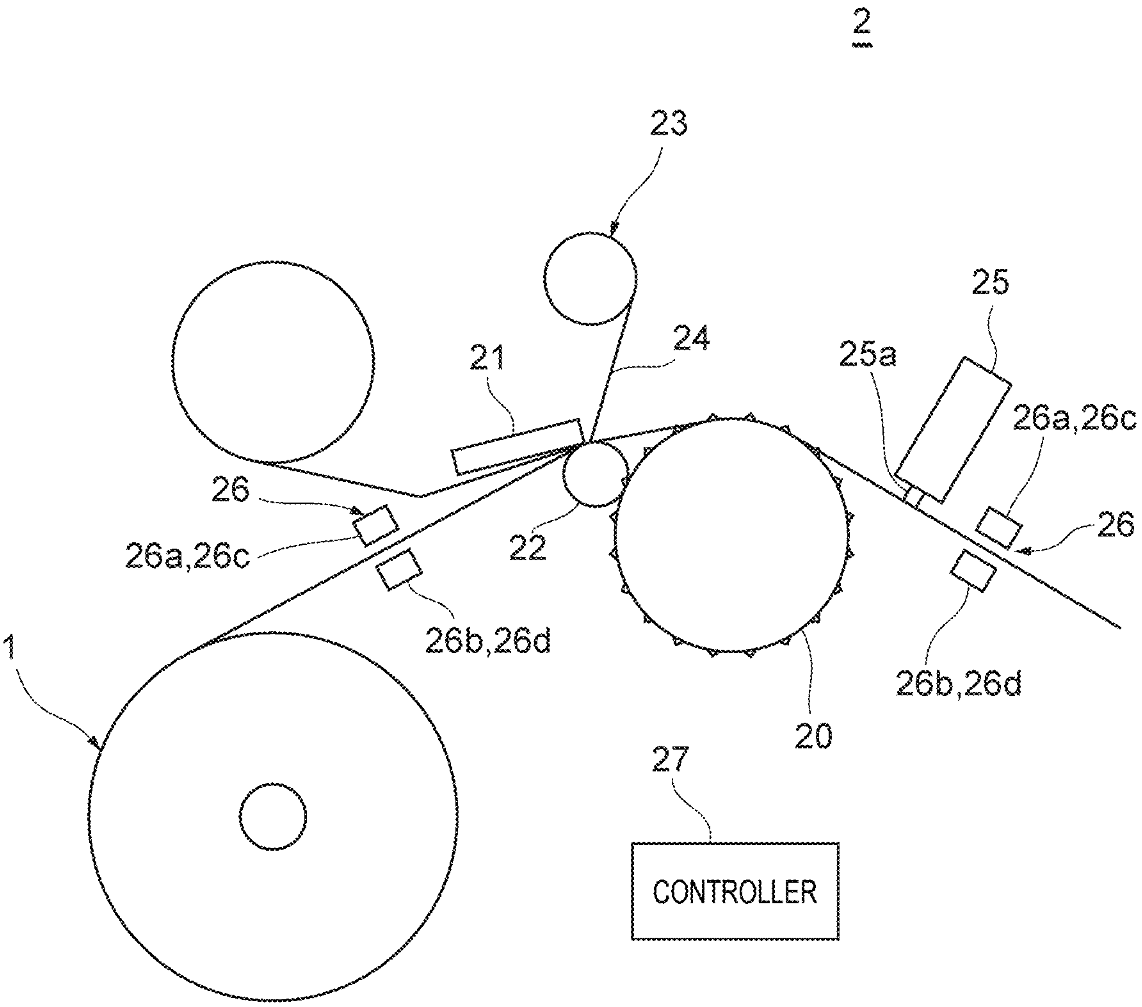
FIG. 6 is a cutting device that prints the long medium according to the embodiment.

As shown in FIG. 6, the long medium 1 as described above is attached to the cutting device 2 in a wound state like a roll paper. Specifically, in the cutting device 2, a roll of the long medium 1 is rotatably mounted (placed) in a storage portion (not shown) within a device body. The long medium 1 pulled out from the roll is guided and moved by a guide member while the sprocket 20 are engaged with the first conveyance holes TH1 and the second conveyance holes TH2. The cutting device 2 further includes a thermal head 21 that applies thermal energy in accordance with print data and is disposed opposite a platen 22 upstream of the sprocket 20 in a moving direction of the long medium 1. Furthermore, an ink ribbon cartridge 23 is attached to the cutting device 2, and an ink ribbon 24 is interposed between the thermal head 21 and the platen 22. The ink ribbon 24 is overlapped between the thermal head 21 and the platen 22, and the ink ribbon 24 is pressed against a print layer that constitutes the adhesive sheet AS of the long medium 1. The thermal energy is applied to the long medium 1 by the thermal head 21 in accordance with the print data, so that a dye of the ink ribbon 24 is transferred to the print layer of the long medium 1, thereby forming an image.

Further, a cutting mechanism 25 that half-cuts the printed long medium 1 is provided downstream of the sprocket 20. The cutting mechanism 25 includes, for example, a cutter 25*a* that moves in a width direction (short side direction) of the long medium 1, and the cutter 25*a* moves in the width direction (short side direction) of the long medium 1 while the long medium 1 moves, thereby cutting the adhesive sheet of the long medium 1 into a predetermined shape.

A remaining amount detection sensor 26 may be provided upstream of the thermal head 21 or downstream of the cutting mechanism 25. The cutting device 2, which serves as the remaining amount detection sensor 26, has a configuration in which a plurality of first light-emitting units 26*b* provided on a lower side to detect the first reference hole RH1 and the first index hole IH1, respectively, and a plurality of first light-receiving units 26*a* provided on an upper side to detect light emitted from the first light-emitting units 26*b*, respectively, are disposed opposite each other. Further, the cutting device 2 has a configuration in which a plurality of second light-emitting units 26*d* provided on the lower side to detect the second reference hole RH2 and the second index hole IH2 and a plurality of second light-receiving units 26*c* provided on the upper side to detect light emitted from the second light-emitting units 26*d*, respectively, are disposed opposite each other.

The cutting device 2 controls a motor that drives the sprocket 20, the remaining amount detection sensor 26, the cutting mechanism 25, the thermal head 21, and the like by a controller 27 such as a microcomputer. For example, when the long medium 1 moves, the controller 27 calculates the remaining amount of the long medium 1 based on outputs of the first and second light-receiving units 26*a* and 26*c* of the remaining amount detection sensor 26. Further, when the remaining amount of the long medium 1 is shorter than a length of a print area corresponding to the print data, the controller 27 notifies the user of a shortage of the long medium via a display unit or a speaker.

A printing unit of the cutting device 2 is not limited to a configuration including the thermal head 21, and may be another configuration capable of performing printing on the long medium 1, for example, a configuration including an ink jet type head that presses an ink with a pressure generated by a heater or a piezoelectric element, ejects the pressed ink as droplets from an ejection port onto the long medium 1, and prints images or characters on the long medium 1.

The cutting device 2 may not include the printing unit such as the thermal head 21, and may include only a cutting mechanism that performs the half-cutting. Further, the cutting device 2 may include a cutting mechanism capable of cutting the release paper of the long medium 1 in addition to a half-cut function.

As described above, according to the long medium 1 of the present embodiment, it is possible to display the remaining amount of the long medium 1 in detail, which makes it possible to prevent a situation in which a large amount of ink, the long medium 1, and the printing time required for the printing are wasted since the remaining amount is insufficient compared to the length of the pattern or the like to be printed.

Further, as described above, the remaining amount of the long medium 1 can be grasped by the cutting device 2 or the like, and printing control can also be performed based on grasped remaining amount information.

Further, various modifications can be made without departing from the scope of the present disclosure. For example, the various holes disclosed in the present embodiment, such as the first reference hole RH1 and the first index hole IH1, may be implemented by drilling through holes in the release paper and covering the through holes with a light-transmitting film or the like. Even with such a configuration, the first reference hole RH1 and the like can be detected by a device having a configuration like the cutting device 2.

The various holes disclosed in the present embodiment may not necessarily be entirely covered with the long medium 1, and may be implemented by, for example, a configuration connected to the first long side LS1 or the second long side LS2 that forms an outer edge of the long medium 1. For example, the first reference hole RH1 may be implemented by a hole of a configuration extending in the short side direction connected to the first long side LS1. Alternatively, a hole may be connected to another hole. Even with such a configuration, the first reference hole RH1 and the like can be detected by the device having a configuration like the cutting device 2.

As described above, the various holes disclosed in the present embodiment, such as the first reference hole RH1 and the first index holes IH1, are understood to include the modified configurations described above.

Although it is also conceivable to achieve the object of the present disclosure by printing on the release paper, a surface of the release paper is generally coated to promote release, making it unsuitable for printing. Similarly, a back surface of the release paper may be coated to provide a moisture barrier. In addition, in many cases, a mass, a logo, or the like is printed on a general-purpose original fabric by preprinting, and thus in a case in which a long medium is manufactured based on the original fabric, a mass or the like may be printed on the release paper. Therefore, the configuration shows the remaining amount and used amount by the holes, such as the long medium according to the present disclosure can be universally applied to various materials.

Second Embodiment

Hereinafter, a long medium 1X according to the present embodiment will be described. However, components having the same or similar configuration, shape, or function are denoted by the same or similar reference numerals, a description thereof will be omitted, and different portions will be described discontinuously.

Figure 7A:
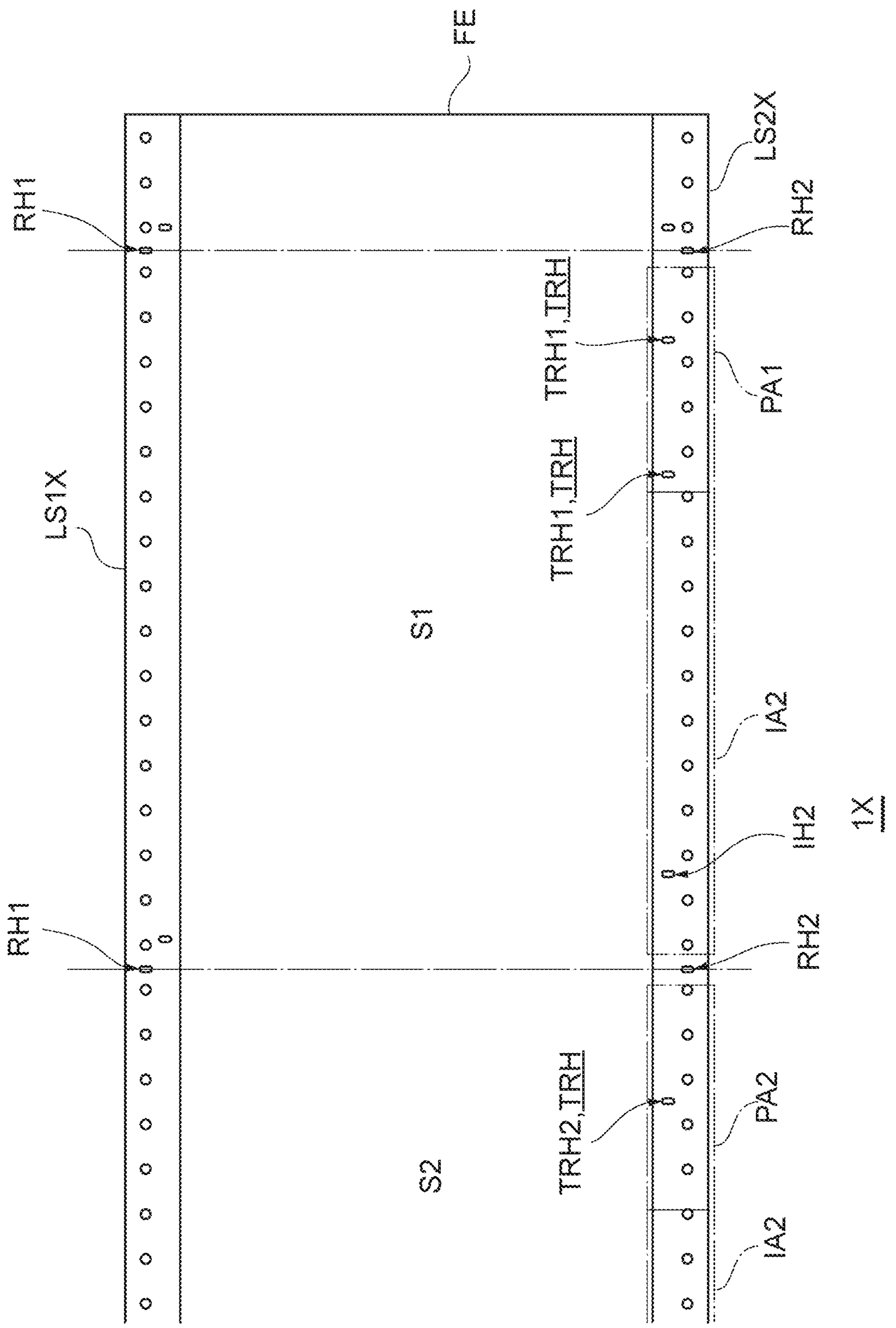
FIG. 7A is a part of a long medium according to another embodiment.
Figure 7B:
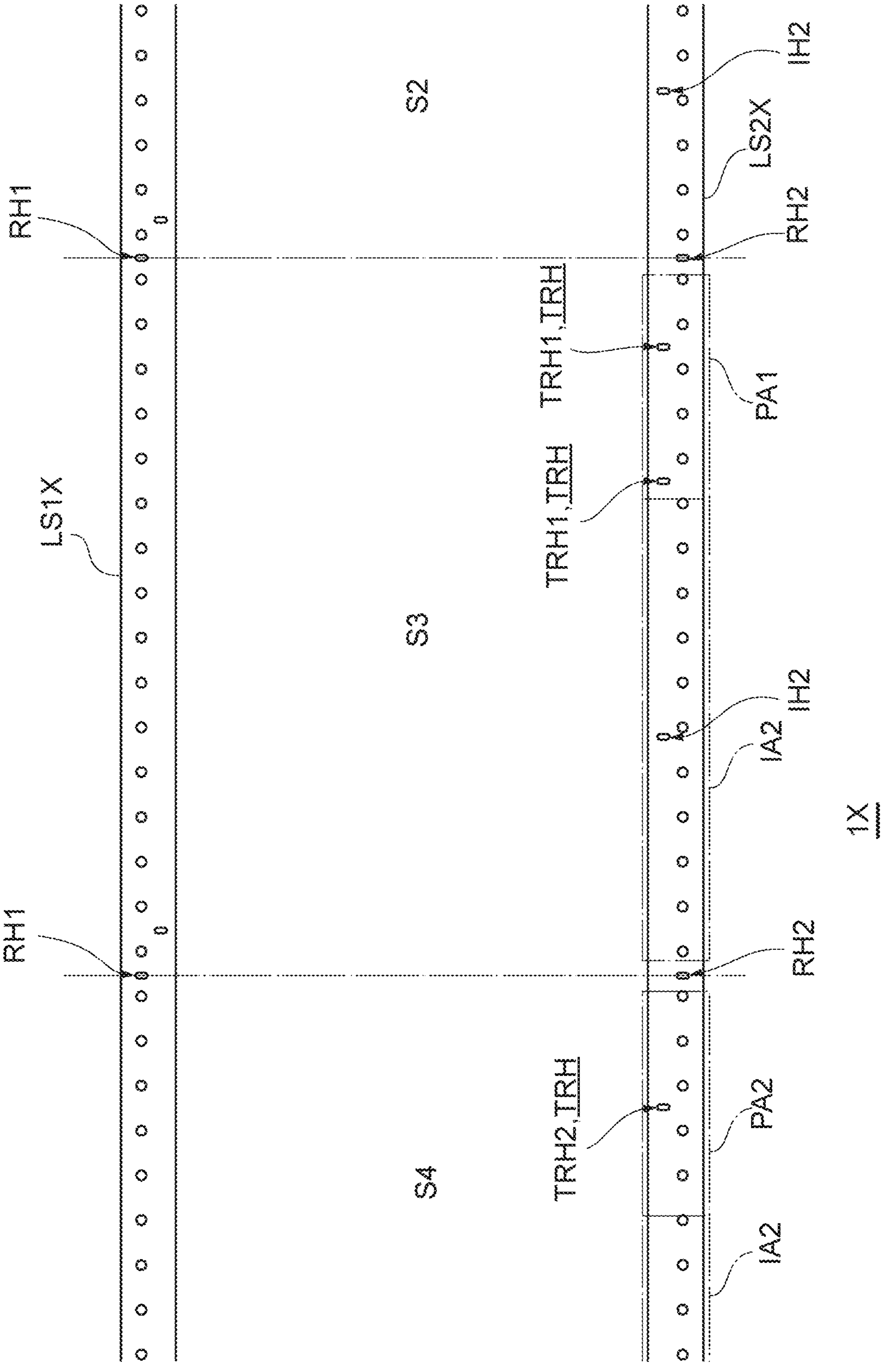
FIG. 7B is a part of the long medium according to the other embodiment.

FIGS. 7A and 7B are plan views showing a part of the long medium 1X including the final end FE of the long medium 1X according to the present embodiment. As shown in the figures, a first side edge LS1X of the long medium 1X is different from the first side edge LS1 of the long medium 1 in that the first side edge LS1X is formed in a straight line or linear shape in the longitudinal direction. Similarly, a second side edge LS2X of the long medium 1X is different from the second side edge LS2 of the long medium 1 in that the second side edge LS2X is formed in a straight line or linear shape in the longitudinal direction. As a result, the long medium 1X is also different from the long medium 1 in that a configuration corresponding to the pinched portion is not provided in the partial area PA of the long medium 1X.

The partial area PA of the long medium 1X includes a first partial area PA1 in which a first type display hole TRH1 for displaying a first type of the long medium 1X is formed, and a second partial area PA2 in which a second type display hole TRH2 for displaying a second type of the long medium 1X is formed. The first partial area PA1 and the second partial area PA2 are alternately disposed in the longitudinal direction of the long medium 1X.

Therefore, for example, when the partial area PA of the first segment S1 is used as the first partial area PA1 for displaying the first type of the long medium 1X, the partial area PA of the following second segment S2 is used as the second partial area PA2 for displaying the second type of the long medium 1X, the partial area PA of the following third segment S3 is again used as the first partial area PA1, and the partial area PA of the further following fourth segment S4 is used as the second partial area PA2. Similarly alternate first partial area PA1 and the second partial area PA2 in the following are alternately and repeatedly disposed.

As described in the first embodiment, the plurality of types are, for example, the cutting pressure (an example of the "first type") of the long medium and the material (an example of the "second type") of the long medium, but the present invention is not limited thereto.

A method for showing information of the long medium according to the position and the number of the type display hole TRH is as described above with reference to FIG. 3 and the like, and thus the description thereof is omitted.

As described above, according to the long medium 1X of the present embodiment, in addition to the effects based on the configuration common to the long medium 1, the plurality of types (for example, a cutting pressure and a material) can be indicated in a single long medium.

As a method for distinguishing the first type display hole TRH1 formed in the first partial area PA1 from the second type display hole TRH2 formed in the second partial area PA2, a large number of methods may be used. For example, values of the second reference length L2, M, or the like may be set such that the first type display hole TRH1 and the second type display hole TRH2 can be distinguished depending on whether the remaining amount of the long medium 1, which is determined based on the position of the second index hole IH2, is an even number or an odd number.

With such a configuration, when the detailed remaining amount is grasped based on the position of the second index hole IH2, the first or second type of the long medium can be grasped based on a combination of the position of the second index hole IH2 and a position of the first type display hole TRH1 or the second type display hole TRH2.

Alternatively, the number of first type display holes TRH1 formed in a single first partial area PA1 may be one, while the number of second type display holes TRH2 formed in a single second partial area PA2 may be two or more, thereby making the two distinguishable.

Figure 8A:
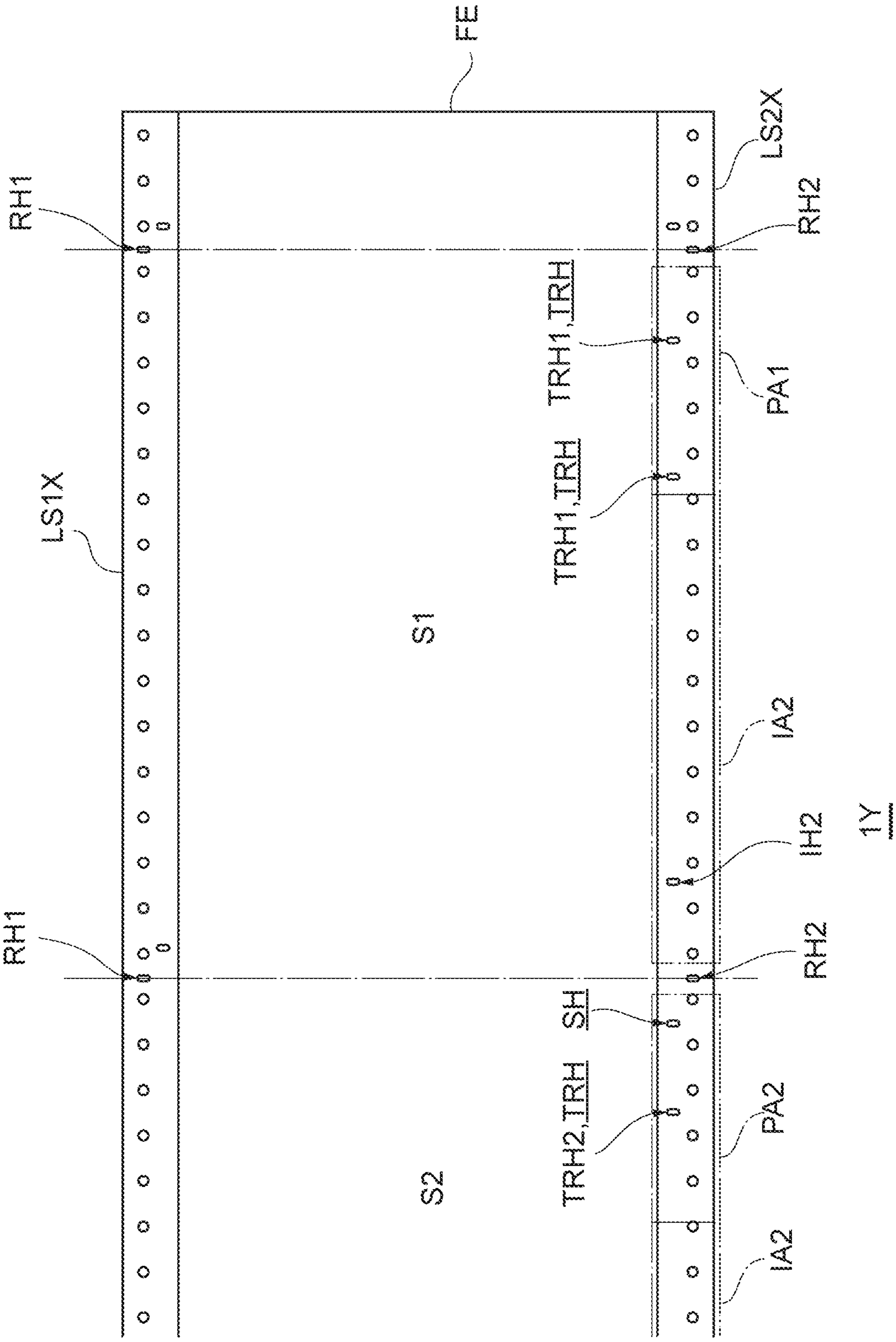
FIG. 8A is a part of a long medium according to another embodiment.
Figure 8B:
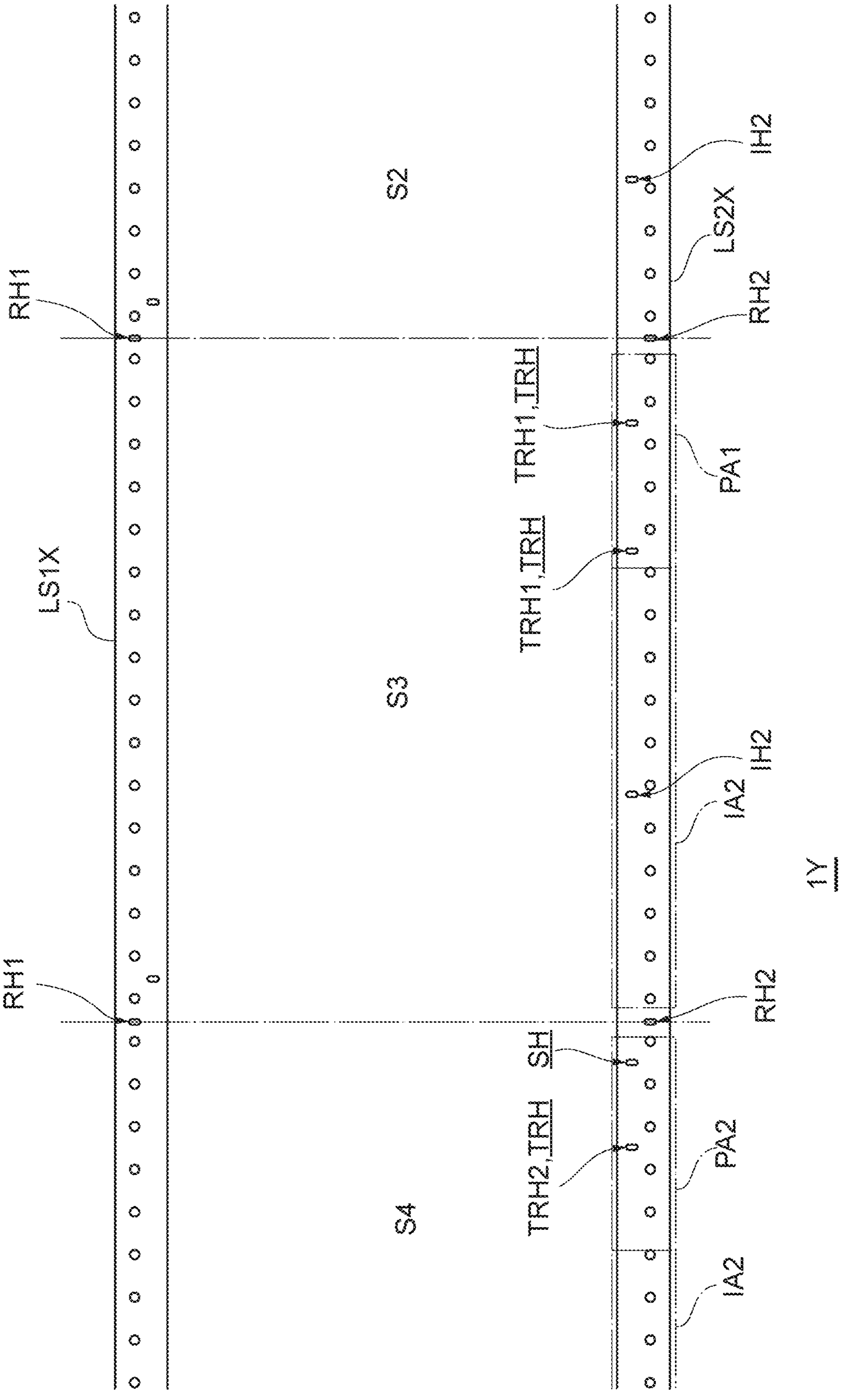
FIG. 8B is a part of the long medium according to the other embodiment.

FIGS. 8A and 8B are plan views showing a part of a long medium 1Y including the final end FE of the long medium 1Y according to a modification of the present embodiment. The long medium 1Y according to this modification differs from the long medium 1X according to the present embodiment in that a specific hole SH for specifying that the type display hole TRH formed in the second partial area PA2 indicates the second type rather than the first type is formed in the second partial area PA2. The specific hole SH may be formed at a predetermined position in the second partial area PA2.

With such a configuration, it is possible to distinguish whether the hole formed in the partial area PA is the first type display hole TRH1 or the second type display hole TRH2 depending on the presence or absence of the specific hole SH.

As shown in FIG. 8A and the like, the specific hole SH may be formed between the (N−1)th second conveyance hole TH2 and the Nth second conveyance hole TH2.

With such a configuration, the specific hole SH is formed at a position close to the start end SE side with respect to the second reference hole RH2, so that the specific hole SH can be easily visually grasped.

The specific hole SH may be formed in a shape different from that of the second type display hole TRH2. For example, the specific hole SH may be formed to have a shape having an area larger or smaller than that of the second type display hole TRH2. For example, a dimension of the specific hole SH in the longitudinal direction of the long medium 1X may be larger or smaller than a dimension of the second type display hole TRH2 in the longitudinal direction of the long medium 1X.

With such a configuration, it is possible to visually and easily grasp the specific hole SH. In particular, since the longitudinal direction of the long medium 1X is a direction in which a line of sight of the user moves, it is possible to easily grasp the specific hole SH by making the dimension of the specific hole SH in the longitudinal direction different from the dimension of the second type display hole TRH2.

Further, the long medium 1X of the present embodiment is configured to alternately display the first type and the second type of the long medium 1X, but the present disclosure is not limited to this, and the long medium may show three or more types. For example, the long medium may be formed such that the first partial area PA1 in which the first type display hole TRH1 for displaying the first type (for example, a cutting pressure) of the long medium is formed, the second partial area PA2 in which the second type display hole TRH2 for displaying the second type (for example, a material) of the long medium is formed, and a third partial area (not shown) in which a third type display hole (not shown) for displaying a third type (for example, a color) of the long medium is formed are repeated in sequence in the longitudinal direction of the long medium.

With such a configuration, even though the long medium is a single long medium, it is possible to show information relating to three or more types of the long medium.

Furthermore, the present disclosure includes the following embodiments.

[Appendix 1]

(Appendix 1-1)

A long medium including:

a plurality of first conveyance holes and a plurality of second conveyance holes provided at equal intervals, that is, a second pitch in straight lines in both side edge portions in a longitudinal direction;

a plurality of first reference holes provided repeatedly at equal intervals, that is, a first pitch larger than the second pitch in a straight line in a first side edge portion, which is one of the side edge portions;

a plurality of first index holes provided repeatedly at a third pitch smaller than the first pitch in a straight line different from a row of the first reference holes in the first side edge portion;

a plurality of second reference holes provided repeatedly at equal intervals, that is, the first pitch in a straight line in a second side edge portion, which is the other of the side edge portions; and a plurality of second index holes provided repeatedly in a straight line different from a row of the second reference holes in the second side edge portion, the second index holes being formed by alternating a plurality of first circulating holes formed continuously at a fourth pitch smaller than the third pitch with respect to the second index hole adjacent to a start end side of the long medium, and a second circulating hole formed at a fifth pitch larger than the first pitch with respect to the first circulating hole adjacent to the start end side, in which the interval between the first conveyance holes in the first side edge portion constitutes a scale indicating a first reference length, which is set as a first unit length of the long medium, a first ratio between the second pitch and the first reference length and a second ratio between a difference between the first pitch and the third pitch and the first pitch are set to be substantially the same, the first index holes are provided so as to gradually approach the first reference hole on the start end side of the long medium as approaching a final end of the long medium, the interval between the second conveyance holes in the second side edge portion is set as a second unit length of the long medium, and constitutes a scale indicating a second reference length shorter than the first reference length, a third ratio between the second pitch and the second reference length and a fourth ratio between a difference between the first pitch and the fourth pitch and the first pitch are set to be substantially the same, and the second index holes are provided such that, as approaching the final end of the long medium, the plurality of first circulating holes gradually approaching the first reference hole on the start end side of the long medium and the second circulating hole approaching the first reference hole on the final end side of the long medium again are alternately and repeatedly.

According to the aspect according to the appendix 1-1, since it is possible to display the remaining amount based on the third ratio between the second pitch and the second reference length as well as the first ratio between the second pitch and the first reference length, the detailed display of the remaining amount is possible.

(Appendix 1-2)

The long medium according to any one of appendixes 1 including the appendix 1-1, in which N pieces of the first conveyance holes are formed between the adjacent first reference holes (in which N is a positive integer), N pieces of the second conveyance holes are formed between the adjacent first reference holes, the first index holes are respectively located in first index hole forming areas each set between the adjacent first reference holes, the second index holes are respectively located in second index hole forming areas each set to an area from a first second conveyance hole adjacent to the final end side with respect to the second reference hole on the start end side to an Mth second conveyance hole between the adjacent second reference holes (in which M is a positive integer equal to or smaller than N), when the first pitch is P1, the second pitch is P2, the third pitch is P3, the fourth pitch is P4, the fifth pitch is P5, the first reference length is L1, the first ratio is S1, the second reference length is L2, and the third ratio is S2, $$S1=P2/L1,$$

$$L2=L1/(M-1),$$

$$S2=P2/L2,$$

$$P3=P1-P1\times S1,$$

$$P4=P1-P1\times S2, \text{ and}$$

$$P5=P2\times(M-1)+P4,$$

when the plurality of first circulating holes formed between adjacent second circulating holes are formed in the second index hole forming area closer to a start end and farther away from the final end, the first circulating holes are formed at positions farther away from an end portion on the start end side of the second index hole forming area and closer to an end portion on the final end side thereof, and the second circulating hole adjacent to the start end side of the plurality of first circulating holes is formed at a position farther away from the end portion on the start end side of the second index hole forming area in which the second circulating hole is formed and closer to the end portion on the final end side thereof.

According to the aspect according to the appendix 1-2, since the fourth pitch P4 is (P1−P1×S2) and the fifth pitch P5 is (P2×(M−1)+P4), the second index holes can accurately represent the remainder obtained by dividing the remaining amount of the long medium in that segment by the first reference length.

(Appendix 1-3)

The long medium according to any one of the appendixes 1 including the appendix 1-2, in which a type display portion that indicates a type of the long medium is provided in a partial area from the Mth second conveyance hole to an Nth second conveyance hole with reference to the first second conveyance hole adjacent to the final end side of the second reference hole on the start end side.

According to the aspect according to the appendix 1-3, the type of the long medium can be set on the long medium.

(Appendix 1-4)

The long medium according to any one of the appendixes 1 including the appendix 1-3, in which the type display portion is formed with one or more type display holes.

According to the aspect according to the appendix 1-4, the type of the long medium can be indicated by using the hole formed in the long medium.

(Appendix 1-5)

The long medium according to any one of the appendixes 1 including the appendix 1-4, in which at least one of the type display holes is formed at an intermediate position between adjacent second conveyance holes in the longitudinal direction.

According to the aspect according to the appendix 1-5, it is possible to prevent a decrease in strength of the long medium caused by the type display hole.

(Appendix 1-6)

The long medium according to any one of the appendixes 1 including the appendix 1-3, in which the second side edge portion of the type display portion is formed with one or more concave portions recessed in a direction approaching the first side edge portion.

According to the aspect according to the appendix 1-6, it is possible to distinguish between the second index hole and the type display hole.

(Appendix 1-7)

The long medium according to any one of the appendixes 1 including the appendix 1-3 or the appendix 1-6, in which the second side edge portion of the partial area is formed with one or more second pinched portions protruding in a direction away from the first side edge portion.

According to the aspect according to the appendix 1-7, one sheet can be easily pinched and removed in the stacked state.

(Appendix 1-8)

The long medium according to any one of the appendixes 1 including the appendix 1-7, in which a distance in the longitudinal direction between the second pinched portion formed on one partial area between the adjacent second reference holes and the second reference hole on the start end side is different from a distance in the longitudinal direction between the second pinched portion formed in another partial area between further adjacent second reference holes and the second reference hole on the start end side.

According to the aspect according to the appendix 1-8, since the second pinched portion of a lower sheet and the second pinched portion of an upper sheet do not overlap with each other, one sheet can be easily pinched and removed in the stacked state.

(Appendix 1-9)

The long medium according to any one of the appendixes 1 including the appendix 1-8, in which the first side edge portion of the first index hole forming area is formed with a first pinched portion having one or more concave portions recessed in a direction approaching the second side edge portion.

According to the aspect according to the appendix 1-9, one sheet is easily pinched and removed in the stacked state from either a first side edge portion side or a second side edge portion side.

(Appendix 1-10)

The long medium according to any one of the appendixes 1 including the appendix 1-9, in which a distance in the longitudinal direction between the first pinched portion formed between the adjacent first reference holes and the first reference hole on the start end side is different from a distance in the longitudinal direction between the first pinched portion formed between further adjacent first reference holes and the first reference hole on the start end side.

According to the aspect according to the appendix 1-10, since the first pinched portion of the lower sheet (one segment surrounded by the adjacent first reference holes and the adjacent second reference holes; the same applies below) and the first pinched portion of the upper sheet do not overlap with each other, one sheet can be easily pinched and removed in the stacked state.

(Appendix 1-11)

The long medium according to any one of the appendixes 1 including the appendix 1-10, in which a pitch between the second pinched portion formed in one partial area of one divided area surrounded by the adjacent first reference holes and the adjacent second reference holes and the second pinched portion formed in another partial area of another adjacent divided area is the same as a pitch between one first pinched portion formed in the one divided area and another first pinched portion formed in the other adjacent divided area.

According to the aspect according to the appendix 1-11, since the first pinched portion and the second pinched portion of the lower sheet and the first pinched portion and the second pinched portion of the upper sheet do not overlap with each other, one sheet can be easily pinched and removed in the stacked state.

(Appendix 1-12)

The long medium according to any one of the appendixes 1 including the appendix 1-11, in which the second pinched portion formed in the one partial area of the one divided area and the one first pinched portion formed in the one divided area are formed at the same position in the longitudinal direction.

According to the aspect according to the appendix 1-12, since the first pinched portion and the second pinched portion of the same sheet are formed at the same position, one sheet can be easily pinched and removed in the stacked state.

[Appendix 2]

(Appendix 2-1)

A long medium having a start end, a final end, a first side edge connecting the start end and the final end, and a second side edge connecting the start end and the final end, the long medium including:

first reference holes formed at a first pitch along the first side edge;

N pieces of first conveyance holes formed along the first side edge at a second pitch smaller than the first pitch, and formed between adjacent first reference holes (in which N is a positive integer);

second reference holes formed at the first pitch along the second side edge;

N pieces of second conveyance holes formed along the second side edge at the second pitch and formed between adjacent second reference holes; and a second pinched portion formed in a partial area that is an area from an Mth second conveyance hole to an Nth second conveyance hole counted in a final end direction from a first second conveyance hole adjacent to a final end side of the second reference hole on a start end side in an area between the adjacent second reference holes (in which M is a positive integer less than N), the second pinched portion protruding in a direction away from the first side edge, in which a distance in a longitudinal direction between the second pinched portion formed on one partial area between the adjacent second reference holes and the second reference hole on the start end side is different from a distance in the longitudinal direction between the second pinched portion formed in another partial area between further adjacent second reference holes and the second reference hole on the start end side.

According to the aspect according to the appendix 2-1, since the second pinched portion of the lower sheet and the second pinched portion of the upper sheet do not overlap with each other, one sheet can be easily pinched and removed in the stacked state.

(Appendix 2-2)

The long medium according to any one of appendixes 2 including the appendix 2-1, in which the first side edge is formed with a first pinched portion having one or more concave portions recessed in a direction approaching the second side edge.

According to the aspect according to the appendix 2-2, one sheet is easily pinched and removed in the stacked state from either the first side edge portion side or the second side edge portion side.

(Appendix 2-3)

The long medium according to any one of the appendixes 2 including the appendix 2-2, in which a distance in the longitudinal direction between the first pinched portion formed between the adjacent first reference holes and the first reference hole on the start end side is different from a distance in the longitudinal direction between the first pinched portion formed between further adjacent first reference holes and the first reference hole on the start end side.

According to the aspect according to the appendix 2-3, since the first pinched portion of the lower sheet (the one segment surrounded by the adjacent first reference holes and the adjacent second reference holes; the same applies below) and the first pinched portion of the upper sheet do not overlap with each other, one sheet can be easily pinched and removed in the stacked state.

(Appendix 2-4)

The long medium according to any one of the appendixes 2 including the appendix 2-3, in which a pitch between the second pinched portion formed in one partial area of one divided area surrounded by the adjacent first reference holes and the adjacent second reference holes and the second pinched portion formed in another partial area of another adjacent divided area is the same as a pitch between one first pinched portion formed in the one divided area and another first pinched portion formed in the other adjacent divided area.

According to the aspect according to the appendix 2-4, since the first pinched portion and the second pinched portion of the lower sheet and the first pinched portion and the second pinched portion of the upper sheet do not overlap with each other, one sheet can be easily pinched and removed in the stacked state.

(Appendix 2-5)

The long medium according to any one of the appendixes 2 including the appendix 2-4, in which the second pinched portion formed in the one partial area of the one divided area and the one first pinched portion formed in the one divided area are formed at the same position in the longitudinal direction.

According to the aspect according to the appendix 2-5, since the first pinched portion and the second pinched portion of the same sheet are formed at the same position, one sheet can be easily pinched and removed in the stacked state.

(Appendix 2-6)

The long medium according to any one of the appendixes 2 including the appendix 2-5, in which the partial area is provided with a type display portion that indicates a type of the long medium.

According to the aspect according to the appendix 2-6, the type of the long medium can be set on the long medium.

(Appendix 2-7)

The long medium according to any one of the appendixes 2 including the appendix 2-6, in which the second side edge of the type display portion is formed with one or more concave portions recessed in a direction approaching the first side edge.

According to the aspect according to the appendix 2-7, it is possible to distinguish between the second index hole and the type display hole.

(Appendix 2-8)

The long medium according to any one of the appendixes 2 including the appendix 2-7, in which the type display portion is formed with one or more type display holes.

According to the aspect according to the appendix 2-8, the type of the long medium can be indicated by using the hole formed in the long medium.

(Appendix 2-9)

The long medium according to any one of the appendixes 2 including the appendix 2-8, in which at least one of the type display holes is formed at an intermediate position between adjacent second conveyance holes in the longitudinal direction.

According to the aspect according to the appendix 2-9, it is possible to prevent the decrease in strength of the long medium caused by the type display hole.

(Appendix 2-10)

The long medium according to any one of the appendixes 2 including the appendix 2-1, including:

first index holes formed along the first side edge at a third pitch smaller than the first pitch and respectively positioned in first index hole forming areas each set between the adjacent first reference holes; and second index holes respectively positioned in second index hole forming areas each set between the adjacent second reference holes along the second side edge, the second index holes being formed by alternating a plurality of first circulating holes that are continuously formed at a fourth pitch smaller than the third pitch with respect to the second index hole adjacent to the start end side, and a second circulating hole that is formed at a fifth pitch larger than the first pitch with respect to the first circulating hole adjacent to the start end side, in which the second index hole forming area is set to an area from a first second conveyance hole adjacent to the final end side of the second reference hole on the start end side to an Mth second conveyance hole (in which M is a positive integer equal to or smaller than N), when the first pitch is P1, the second pitch is P2, the third pitch is P3, the fourth pitch is P4, the fifth pitch is P5, a first reference length is L1, a first scale is S1, a second reference length is L2, and a second scale is S2, $$S1=P2/L1,$$

$$L2=L1/(M-1),$$

$$S2=P2/L2,$$

$$P3=P1-P1\times S1,$$

$$P4=P1-P1\times S2, \text{ and}$$

$$P5=P2\times(M-1)+P4,$$

when the first index hole is formed in the first index hole forming area closer to the start end and farther away from the final end, the first index hole is formed at a position farther away from an end portion on the start end side of the first index hole forming area and closer to an end portion on the final end side thereof, when the plurality of first circulating holes formed between adjacent second circulating holes are formed in the second index hole forming area closer to the start end and farther away from the final end, the first circulating holes are formed at positions farther away from the end portion on the start end side of the second index hole forming area and closer to the end portion on the final end side thereof, and the second circulating hole adjacent to the start end side of the plurality of first circulating holes is formed at a position farther away from the end portion on the start end side of the second index hole forming area in which the second circulating hole is formed and closer to the end portion on the final end side thereof.

According to the aspect according to the appendix 2-10, since the fourth pitch P4 is (P1−P1×S2) and the fifth pitch P5 is (P2×(M−1)+P4), the second index holes can accurately represent the remainder obtained by dividing the remaining amount of the long medium in that segment by the first reference length.

[Appendix 3]

(Appendix 3-1)

A long medium having a start end, a final end, a first side edge connecting the start end and the final end, and a second side edge connecting the start end and the final end, the long medium including:

first reference holes formed at a first pitch along the first side edge;

N pieces of first conveyance holes formed along the first side edge at a second pitch smaller than the first pitch, and formed between adjacent first reference holes (in which N is a positive integer);

second reference holes formed at the first pitch along the second side edge;

N pieces of second conveyance holes formed along the second side edge at the second pitch and formed between adjacent second reference holes; and a type display hole formed in a partial area that is an area from an Mth second conveyance hole to an Nth second conveyance hole counted in a final end direction from a first second conveyance hole adjacent to a final end side of the second reference hole on a start end side in an area between the adjacent second reference holes (in which M is a positive integer less than N), the type display hole indicating a type of the long medium.

According to the aspect according to the appendix 3-1, the type of the long medium can be set on the long medium.

(Appendix 3-2)

The long medium according to any one of appendixes 3 including the appendix 3-1, in which at least one of the type display holes is formed at an intermediate position between adjacent second conveyance holes in the longitudinal direction.

According to the aspect according to the appendix 3-2, it is possible to prevent the decrease in strength of the long medium caused by the type display hole.

(Appendix 3-3)

The long medium according to any one of the appendixes 3 including the appendix 3-2, in which the type display hole is provided in a type display portion that indicates the type of the long medium, and the second side edge of the type display portion is formed with one or more concave portions recessed in a direction approaching the first side edge.

According to the aspect according to the appendix 3-3, it is possible to distinguish between the second index hole and the type display hole.

(Appendix 3-4)

The long medium according to any one of the appendixes 3 including the appendix 3-3, in which the second side edge of the partial area is formed with one or more second pinched portions protruding in a direction away from the first side edge.

According to the aspect according to the appendix 3-4, one sheet can be easily pinched and removed in the stacked state.

(Appendix 3-5)

The long medium according to any one of the appendixes 3 including the appendix 3-4, in which a distance in the longitudinal direction between the second pinched portion formed on one partial area between the adjacent second reference holes and the second reference hole on the start end side is different from a distance in the longitudinal direction between the second pinched portion formed in another partial area between further adjacent second reference holes and the second reference hole on the start end side.

According to the aspect according to the appendix 3-5, since the second pinched portion of the lower sheet and the second pinched portion of the upper sheet do not overlap with each other, one sheet can be easily pinched and removed in the stacked state.

(Appendix 3-6)

The long medium according to any one of the appendixes 3 including the appendix 3-1, further including:

a second pinched portion formed in the partial area and protruding in a direction away from the first side edge, in which a distance in a longitudinal direction between the second pinched portion formed on one partial area between the adjacent second reference holes and the second reference hole on the start end side is different from a distance in the longitudinal direction between the second pinched portion formed in another partial area between further adjacent second reference holes and the second reference hole on the start end side, the type display hole formed in the one partial area displays the type of the long medium based on a first type, and the type display hole formed in the other partial area displays the type of the long medium based on a second type.

According to the aspect according to the appendix 3-6, it is possible to provide a classification based on at least two types of the long media (types selected from a color, a cutting pressure, a length, a material, and the like of the long medium) on the long medium.

(Appendix 3-7)

The long medium according to any one of the appendixes 3 including the appendix 3-6, in which the first side edge is formed with a first pinched portion having one or more concave portions recessed in a direction approaching the second side edge.

According to the aspect according to the appendix 3-7, one sheet is easily pinched and removed in the stacked state from either the first side edge portion side or the second side edge portion side.

(Appendix 3-8)

The long medium according to any one of the appendixes 3 including the appendix 3-7, in which a distance in the longitudinal direction between the first pinched portion formed between the adjacent first reference holes and the first reference hole on the start end side is different from a distance in the longitudinal direction between the first pinched portion formed between further adjacent first reference holes and the first reference hole on the start end side.

According to the aspect according to the appendix 3-8, since the first pinched portion of the lower sheet (the one segment surrounded by the adjacent first reference holes and the adjacent second reference holes; the same applies below) and the first pinched portion of the upper sheet do not overlap with each other, one sheet can be easily pinched and removed in the stacked state.

(Appendix 3-9)

The long medium according to any one of the appendixes 3 including the appendix 3-8, in which a pitch between the second pinched portion formed in one partial area of one divided area surrounded by the adjacent first reference holes and the adjacent second reference holes and the second pinched portion formed in another partial area of another adjacent divided area is the same as a pitch between one first pinched portion formed in the one divided area and another first pinched portion formed in the other adjacent divided area.

According to the aspect according to the appendix 3-9, since the first pinched portion and the second pinched portion of the lower sheet and the first pinched portion and the second pinched portion of the upper sheet do not overlap with each other, one sheet can be easily pinched and removed in the stacked state.

(Appendix 3-10)

The long medium according to any one of the appendixes 3 including the appendix 3-9, in which the second pinched portion formed in the one partial area of the one divided area and the one first pinched portion formed in the one divided area are formed at the same position in the longitudinal direction.

According to the aspect according to the appendix 3-10, since the first pinched portion and the second pinched portion of the same sheet are formed at the same position, one sheet can be easily pinched and removed in the stacked state.

(Appendix 3-11)

The long medium according to any one of the appendixes 3 including the appendix 3-1, further including:

first index holes formed along the first side edge at a third pitch smaller than the first pitch and respectively positioned in first index hole forming areas each set between the adjacent first reference holes; and second index holes respectively positioned in second index hole forming areas each set between the adjacent second reference holes along the second side edge, the second index holes being formed by alternating a plurality of first circulating holes that are continuously formed at a fourth pitch smaller than the third pitch with respect to the second index hole adjacent to the start end side, and a second circulating hole that is formed at a fifth pitch larger than the first pitch with respect to the first circulating hole adjacent to the start end side, in which the second index hole forming area is set to an area from a first second conveyance hole adjacent to the final end side of the second reference hole on the start end side to an Mth second conveyance hole (in which M is a positive integer equal to or smaller than N), when the first pitch is P1, the second pitch is P2, the third pitch is P3, the fourth pitch is P4, the fifth pitch is P5, a first reference length is L1, a first scale is S1, a second reference length is L2, and a second scale is S2, $$S1=P2/L1,$$

$$L2=L1/(M-1),$$

$$S2=P2/L2,$$

$$P3=P1-P1\times S1,$$

$$P4=P1-P1\times S2, \text{ and}$$

$$P5=P2\times(M-1)+P4,$$

when the first index hole is formed in the first index hole forming area closer to the start end and farther away from the final end, the first index hole is formed at a position farther away from an end portion on the start end side of the first index hole forming area and closer to an end portion on the final end side thereof, when the plurality of first circulating holes formed between the adjacent second circulating holes are formed in the second index hole forming area closer to the start end and farther away from the final end, the first circulating holes are formed at positions farther away from the end portion on the start end side of the second index hole forming area and closer to the end portion on the final end side thereof, and the second circulating hole adjacent to the start end side of the plurality of first circulating holes is formed at a position farther away from the end portion on the start end side of the second index hole forming area in which the second circulating hole is formed and closer to the end portion on the final end side thereof.

According to the aspect according to the appendix 3-11, since the fourth pitch P4 is (P1-P1×S2) and the fifth pitch P5 is (P2×(M−1)+P4), the second index holes can accurately represent the remainder obtained by dividing the remaining amount of the long medium in that segment by the first reference length.

In addition, it is possible to add a part of constituent elements of an embodiment to another embodiment within the scope of the ordinary creativity of a person skilled in the art. Furthermore, some constituent elements in one embodiment may be replaced with corresponding constituent elements in another embodiment or may be omitted.

For example, the number of the second conveyance holes TH2 is not limited to the present embodiment, and the length of the second index hole forming area IA2 is not limited to the present embodiment. Further, positions of the various holes in the short side direction can be appropriately changed.

The configurations disclosed in the present application, such as the first index holes H1 and the second index holes IH2, may not be provided in all parts of the long medium 1, and may be formed only in a single segment, only in a plurality of consecutive segments, or only in a plurality of segments spaced apart from each other. For example, since it is clear that the remaining amount of the long medium 1 is small in a segment near the final end FE, the first index holes IH1 and the like may not be formed. Further, since it is clear that the remaining amount of the long medium 1 is sufficient in the segment near the start end SE, the second index holes IH2 and the like may not be formed. Furthermore, for example, a long medium may be formed such that a configuration in which one of two consecutive segments has the configuration disclosed in the present application, such as the first index hole IH1 and the second index hole IH2, and the other segment has another configuration is repeated.

What is claimed is:

1. A long medium having:

a start end;

a final end opposite the start end in a longitudinal direction;

a first side edge connecting the start end and the final end;

a second side edge connecting the start end and the final end, the second side edge being spaced apart from the first side edge in a width direction perpendicular to the longitudinal direction;

first reference holes formed at a first pitch along the first side edge;

N first conveyance holes formed along the first side edge at a second pitch smaller than the first pitch, and formed between adjacent first reference holes, in which N is a positive integer;

first index holes formed along the first side edge at a third pitch smaller than the first pitch, the first index holes being respectively positioned in different first index hole forming areas, each of the first index hole forming areas being set between different adjacent pairs of the first reference holes;

second reference holes formed at the first pitch along the second side edge;

N second conveyance holes formed along the second side edge at the second pitch and formed between adjacent second reference holes; and second index holes formed along the second side edge, the second index holes positioned in different second index hole forming areas, each of the second index hole forming areas being set between different adjacent pairs of the second reference holes along the second side edge, the second index holes comprising:

a plurality of first circulating holes continuously formed at a fourth pitch, smaller than the third pitch, in a start end direction with respect to one of the second index holes closest to a start end side of a corresponding second index hole forming area, and a plurality of second circulating holes, the second circulating holes being respectively disposed between different adjacent sets of the plurality of first circulating holes in the longitudinal direction, the second circulating holes being respectively formed at a fifth pitch, larger than the first pitch, relative to a respective one of the first circulating holes that is formed in the start end direction from the respective second circulating hole, and closest to the start end side of a corresponding second index hole forming area, and wherein:

the second index hole forming area is defined by an area extending from a first second conveyance hole, of the second conveyance holes, adjacent to a final end side of a first second reference hole, of the second reference holes, to an Mth second conveyance hole, in which M is a positive integer equal to or smaller than N, when the first pitch is P1, the second pitch is P2, the third pitch is P3, the fourth pitch is P4, the fifth pitch is P5, a first reference length is L1, a first scale is S1, a second reference length is L2, and a second scale is S2, $$S1=P2/L1,$$

$$L2=L1/(M-1),$$

$$S2=P2/L2,$$

$$P3=P1-P1\times S1,$$

$$P4=P1-P1\times S2, \text{ and}$$

$$P5=P2\times(M-1)+P4,$$

when the first index hole is formed in one of the first index hole forming areas closer to the start end and farther away from the final end, the first index hole is formed at a position farther away from an end portion on the start end side of the corresponding first index hole forming area and closer to an end portion on the final end side of the corresponding first index hole forming area when compared to a position of another one of the first index holes formed in another one of the first index hole forming areas farther away from the start end and closer to the final end, when, within the plurality of first circulating holes continuously formed between adjacent second circulating holes, the first circulating hole is formed in one of the second index hole forming areas closer to the start end and farther away from the final end, the first circulating hole is formed at a position farther away from an end portion on the start end side of the corresponding second index hole forming area and closer to the end portion on the final end side of the corresponding second index hole forming area, and the second circulating hole, adjacent to the start end side of the plurality of first circulating holes, is formed at a position farther away from the end portion on the start end side of the corresponding second index hole forming area in which the second circulating hole is formed than the plurality of first circulating holes are to the start end side of their corresponding second index hole forming areas, and closer to the end portion on the final end side of the corresponding second index hole forming area than the plurality of first circulating holes are to the final end side of their corresponding second index hole forming areas.

2. The long medium according to claim 1, wherein a type display portion that indicates a type of the long medium is provided in a partial area from the Mth second conveyance hole to an Nth second conveyance hole with reference to the first second conveyance hole adjacent to the final end side of the second reference hole on the start end side.

3. The long medium according to claim 2, wherein the type display portion is formed with one or more type display holes, and the type display portion is configured to indicate a type of the long medium by a positional relationship between the one or more type display holes and the second conveyance holes.

4. The long medium according to claim 3, wherein at least one of the type display holes is formed at an intermediate position between adjacent second conveyance holes in a longitudinal direction.

5. The long medium according to claim 3, wherein a partial area in which one or more first type display holes indicating a first type of the long medium are formed and a partial area in which one or more second type display holes indicating a second type of the long medium are formed are disposed so as to be alternately repeated in a longitudinal direction.

6. The long medium according to claim 5, wherein the one or more second type display holes include a specific hole for specifying that the second type is indicated.

7. The long medium according to claim 2, wherein the second side edge of the type display portion is formed with one or more concave portions recessed in a direction approaching the first side edge.

8. The long medium according to claim 2, wherein the second side edge of the partial area is formed with one or more second pinched portions protruding in a direction away from the first side edge.

9. The long medium according to claim 8, wherein a distance in a longitudinal direction between the second pinched portion formed on one partial area between the adjacent second reference holes and the second reference hole on the start end side is different from a distance in the longitudinal direction between the second pinched portion formed in another partial area between further adjacent second reference holes and the second reference hole on the start end side.

10. The long medium according to claim 9, wherein the first side edge of the first index hole forming area is formed with a first pinched portion having one or more concave portions recessed in a direction approaching the second side edge.

11. The long medium according to claim 10, wherein a distance in the longitudinal direction between the first pinched portion formed between the adjacent first reference holes and the first reference hole on the start end side is different from a distance in the longitudinal direction between the first pinched portion formed between further adjacent first reference holes and the first reference hole on the start end side.

12. The long medium according to claim 11, wherein a pitch between the second pinched portion formed in one partial area of one divided area surrounded by the adjacent first reference holes and the adjacent second reference holes and the second pinched portion formed in another partial area of another adjacent divided area is the same as a pitch between one first pinched portion formed in the one divided area and another first pinched portion formed in the other adjacent divided area.

13. The long medium according to claim 12, wherein the second pinched portion formed in the one partial area of the one divided area and the one first pinched portion formed in the one divided area are formed at the same position in the longitudinal direction.

14. The long medium according to claim 7, wherein the second side edge of the partial area is formed with one or more second pinched portions protruding in a direction away from the first side edge.

15. The long medium according to claim 14, wherein a distance in a longitudinal direction between the second pinched portion formed on one partial area between the adjacent second reference holes and the second reference hole on the start end side is different from a distance in the longitudinal direction between the second pinched portion formed in another partial area between further adjacent second reference holes and the second reference hole on the start end side.

16. The long medium according to claim 15, wherein the first side edge of the first index hole forming area is formed with a first pinched portion having one or more concave portions recessed in a direction approaching the second side edge.

17. The long medium according to claim 16, wherein a distance in the longitudinal direction between the first pinched portion formed between the adjacent first reference holes and the first reference hole on the start end side is different from a distance in the longitudinal direction between the first pinched portion formed between further adjacent first reference holes and the first reference hole on the start end side.

18. The long medium according to claim 17, wherein a pitch between the second pinched portion formed in one partial area of one divided area surrounded by the adjacent first reference holes and the adjacent second reference holes and the second pinched portion formed in another partial area of another adjacent divided area is the same as a pitch between one first pinched portion formed in the one divided area and another first pinched portion formed in the other adjacent divided area.

19. The long medium according to claim 18, wherein the second pinched portion formed in the one partial area of the one divided area and the one first pinched portion formed in the one divided area are formed at the same position in the longitudinal direction.

* * * * *